United States Patent

Koyama

Patent Number: 6,047,004
Date of Patent: Apr. 4, 2000

[54] SYNCHRONIZING DEVICE WITH HEAD WORD POSITION VERIFICATION

[75] Inventor: Masayuki Koyama, Tokyo, Japan

[73] Assignee: Mitsubishi Denki Kabushiki Kaisha, Tokyo, Japan

[21] Appl. No.: 08/964,354

[22] Filed: Nov. 4, 1997

[30] Foreign Application Priority Data

Jun. 18, 1997 [JP] Japan ................................ 9-161315

[51] Int. Cl.⁷ ................................................ H04J 3/07
[52] U.S. Cl. .................................... 370/509; 375/368
[58] Field of Search .................... 370/509, 510, 370/512, 513, 514, 520, 503, 516, 517; 375/354, 365, 366, 368, 369, 370; 348/525, 526, 844

[56] References Cited

U.S. PATENT DOCUMENTS

| | | | |
|---|---|---|---|
| 5,490,147 | 2/1996 | Kubo ........................................ | 370/509 |
| 5,557,614 | 9/1996 | Sandler et al. .......................... | 375/368 |
| 5,671,227 | 9/1997 | Keller et al. ............................ | 370/513 |

FOREIGN PATENT DOCUMENTS 8-111672  4/1996  Japan .
8-172452  7/1996  Japan .

*Primary Examiner*—Chau Nguyen
*Assistant Examiner*—Chiho A. Lee
*Attorney, Agent, or Firm*—Burns, Doane, Swecker & Mathis, LLP

[57] ABSTRACT

From an input data signal (Data_In) formed of a data signal complied with the MPEG standard including unit packets each formed of a sequence of 204 pieces of 8-bit-long unit data assigned in a sequence of 6-bit-long unit data, the original packet-unit data signal is reconfigured. Data having a length of 8 bits are sequentially extracted from two 6-bit-long unit data successively held in buffers (BS1, BS2). Correctness of the position of the head word of the packet is verified on the basis of whether a synchronizing code (Cd) indicating the head word repeatedly appears in the cycles of packets. It is determined whether a cycle of a packet has passed on the basis of a value counted in synchronization with an extraction signal (Dout), eliminating the necessity for the FIFO required in conventional devices. As a result, size reduction and cost reduction of the device are implemented.

12 Claims, 30 Drawing Sheets

F I G. 1 9
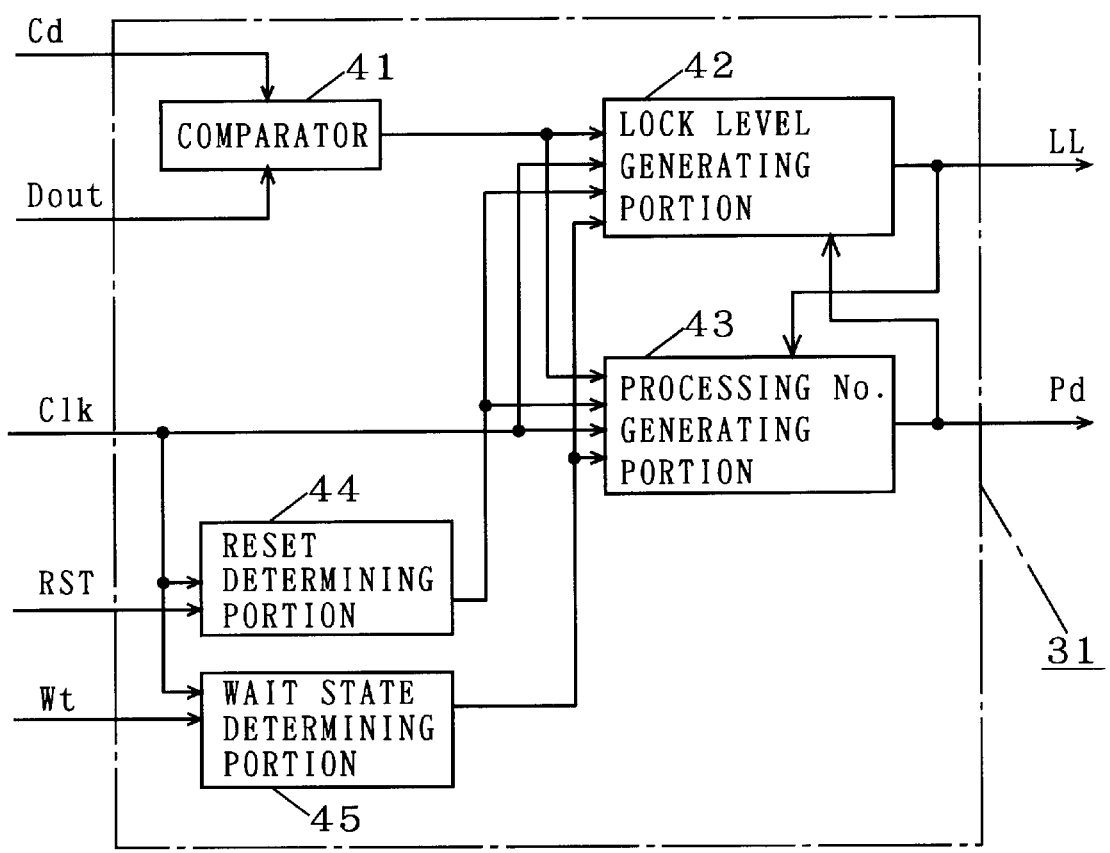

F I G. 2 9
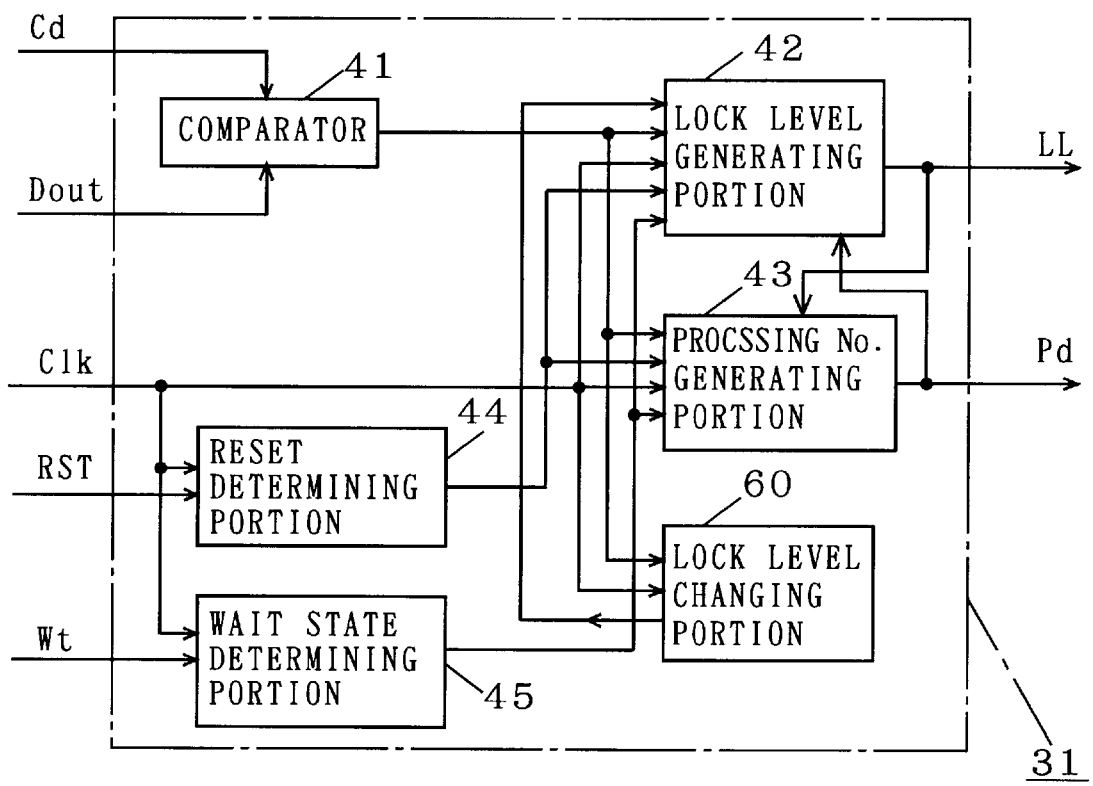

SYNCHRONIZING DEVICE WITH HEAD WORD POSITION VERIFICATION

BACKGROUND OF THE INVENTION

1. Field of the Invention

The present invention relates to synchronizing devices, and particularly to improvement for eliminating the necessity for the FIFO required in a conventional device to realize size reduction of the device.

2. Description of the Background Art

FIG. 40 is a block diagram showing the structure of a conventional synchronizing device as a background of the present invention. This device 150) converts an input data signal Data_In formed of a sequence of 1-bit-long unit data into an output data signal Data_Out formed of a sequence of L-bit-long unit data. The device 150 includes a synchronization control portion 151, L-bit shift registers 152 and 154, a FIFO 153, and comparators 155 and 156.

The 1-bit-long unit data forming the input data signal Data_In is inputted to the L-bit shift register 152 in synchronization with the pulse of a clock signal Clk (i.e., for each clock cycle). The L-bit shift register 152 always holds L unit data inputted in a period of L clock cycles from the present to the past. That is to say, the L-bit shift register 152 corresponds to a serial-parallel converting device for converting serial data into parallel data.

The oldest unit data in the L unit data held in the L-bit shift register 152 is sent to the FIFO 153 in each clock cycle. It is assumed in the description below that the output data signal Data_Out is a data signal based on the MPEG standard, or a data signal formed of unit packets each including a sequence of 204 pieces of 8-bit-long unit data.

In this case, the FIFO 153 has a storage capacity of 8×204 bits. Accordingly, the unit data inputted to the FIFO 153 is outputted after 8×204 clock cycles. The 1-bit-long unit data passed through the FIFO 153 is inputted to the L-bit shift register 154 for each clock cycle. The L-bit shift register 154 is formed identically to the L-bit shift register 152.

The synchronization control portion 151 is a device portion which functions to control operations of the comparators 155, 156, etc. The synchronization control portion 151 is fed with an L-bit-long synchronizing code Cd indicating a head word of a packet. The comparator 155 compares the value of the synchronizing code Cd sent from the synchronization control portion 151 and the L-bit data held in the L-bit shift register 152. Similarly, the comparator 156 compares the value of the synchronizing code Cd sent from the synchronization control portion 151 and the L-bit data held in the L-bit shift register 154.

When the comparators 155 and 156 detect that the L-bit data in the L-bit shift register 152 and the L-bit data in the L-bit shift register 154 simultaneously coincide with the synchronizing code Cd, the synchronization control portion 151 recognizes the synchronizing code Cd as the head word of the packet. Then the sequence of the 1-bit-long unit data is separated by L bits, following after the L-bit-long head word. As a result, L-bit-long unit data is outputted as the output data signal Data_Out. This is realized as the synchronization control portion 151 causes the L-bit data held in the L-bit shift register 154 to be outputted as the output data signal Data_Out for every L clock cycles.

In the conventional synchronizing device constructed as stated above, the FIFO 153 requires a large storage capacity. This gives a obstacle in reducing the number of components forming the device for size reduction and manufacturing cost reduction of the device.

SUMMARY OF THE INVENTION

A first aspect of the present invention is directed to a synchronizing device for receiving an input data signal in which a first data signal formed of unit packets each having a sequence of P ($\geq 2$) pieces of L($\geq 1$)-bit-long first unit data is assigned in a sequence of m($\geq 1$)-bit-long second unit data to form a second data signal, and for reconfiguring the first data signal from the input data signal and outputting the same.

According to the present invention, the synchronizing device comprises: a shift register having a plurality of buffers each having a storage capacity of m bits for successively holding the second unit data forming the input data signal; a pattern data extracting portion for extracting L-bit-long data from the data held in the shift register in correspondence with first to K($\geq 1$)th patterns in which the first unit data is sequentially assigned in the second data signal to obtain first to Kth extraction data; a first comparator portion for comparing each of the first to Kith extraction data with a synchronizing code as an indicator of a head word of the packet; a pattern selecting portion for selecting and outputting one of the first to Kth extraction data as an extraction signal; a state transition control portion for controlling the selecting operation of the pattern selecting portion depending on whether it is in a synchronous state or an asynchronous state; and a synchronization determining portion for determining whether it is in the synchronous state or the asynchronous state.

In this device, the state transition control portion comprises a mode shifting portion for causing the pattern selecting portion to cyclically and sequentially select the first to Kth extraction data so that continuous L-bit-unit data are sequentially extracted from the input data signal, and a mode changing portion for, only in the asynchronous state, every time the comparison in the first comparator portion shows that only a kth ($1 \leq k \leq K$) extraction data coincides with the synchronizing code, causing the sequential selection of the extraction data instructed by the mode shifting portion to the pattern selecting portion to be changed to a sequential selection in which the kth extraction signal corresponding to the kth pattern is set as a candidate for the head word and the extraction data are selected starting from the kth extraction data.

The synchronization determining portion comprises a processing number generating portion capable of cyclically counting P integers as processing numbers in synchronization with output of the extraction signal, a second comparator portion for comparing the extraction signal with the synchronizing code, and a state determining portion for determining whether to make a transition between the synchronous state and the asynchronous state on the basis of the processing number and a result of the comparison in the second comparator portion.

In the asynchronous state, when the comparison in the second comparator portion repeatedly provides agreement between the extraction signal corresponding to the candidate and the synchronizing code at a first certain frequency or more, the state determining portion determines to shift to the synchronous state and sets the candidate providing the agreement as a definite head word, and in the synchronous state, when the comparison in the second comparator portion repeatedly provides disagreement between the extraction signal corresponding to the definite head word and the synchronizing code at a second certain frequency or more, the state determining portion determines to shift to the asynchronous state, wherein the state determining portion determines whether the extraction signal corresponds to the candidate or the definite head word on the basis of the processing number.

Preferably, according to a second aspect, in the synchronizing device, in the asynchronous state, the processing number generating portion causes the processing number to go back to a certain value every time the extraction signal and the synchronizing code agree with each other in the comparison in the second comparator portion, and the state determining portion determines that the extraction signal corresponds to the candidate or the definite head word when the processing number goes back to the certain value via the value preceding the certain value by one.

Preferably, according to a third aspect, in the synchronizing device, the state determining portion further comprises a tag storage portion, and in the asynchronous state, the state determining portion causes the tag storage portion to store the processing number as a tag when the extraction signal set as the candidate is outputted, and after that, compares the processing number with the tag stored in the tag storage portion to determine whether the extraction signal corresponds to the candidate.

Preferably, according to a fourth aspect, in the synchronizing device, the tag storage portion has a storage space capable of storing A (1≦A≦P) values of the processing numbers and stores the values of the processing numbers into the storage space to store the tags.

Preferably, according to a fifth aspect, in the synchronizing device, the tag storage portion has a storage space capable of storing one bit in each of P addresses, and stores a 1-bit signal into one of the addresses which corresponds to the processing number to store the tag.

Preferably, according to a sixth aspect, in the svnchronizing device, the state determining portion further comprises a lock level generating portion for calculating a lock level having a plurality of steps of values from a lower limit to an upper limit, wherein, every time the comparison in the second comparator portion repeatedly provides agreement between the extraction signal corresponding to the candidate or the definite head word and the synchronizing code, the lock level generating portion increases the lock level, one step at a time, in the range not exceeding the upper limit, and every time disagreement is repeatedly obtained, the lock level generating portion decreases the lock level, one step at a time, in the range not falling under the lower limit, and the state determining portion determines whether it is in the asynchronous state or the synchronous state respectively depending on whether the lock level is lower than a certain step or not.

Preferably, according to a seventh aspect, in the synchronizing device, the mode shifting portion makes control so that the pattern selecting portion intactly holds and outputs the preceding extraction signal in a resting period in which the pattern data extracting portion cannot extract any of the first to Kth extraction data from the data held in the shift register, and in the other period, so that the pattern selecting portion performs the selecting operation to output the extraction signal in synchronization with input of the second unit data into the shift register.

Preferably, according to an eighth aspect, the synchronizing device further comprises a clock generating portion for generating and outputting a pulse as a clock signal, wherein the clock generating portion suspends output of the pulse in a resting period in which the pattern data extracting portion cannot extract any of the first to Kth extraction data from the data held in the shift register, and outputs the pulse in synchronization with output of the extraction signal in the other period.

Preferably, according to a ninth aspect, in the synchronizing device, the state transition control portion outputs a certain signal in a resting period in which the pattern data extracting portion cannot extract any of the first to Kth extraction data from the data held in the shift register.

Preferably, according to a tenth aspect, the synchronizing device further comprises a data output portion which, in the synchronous state, outputs the synchronizing code independently of the value of the extraction signal when the extraction signal corresponds to the definite head word, and outputs the extraction signal as it is when the extraction signal does not correspond to the definite head word.

Preferably, according to an eleventh aspect, the synchronizing device further comprises a head signal generating portion which outputs a certain signal when the extraction signal outputted from the pattern selecting portion corresponds to the candidate or the definite head word.

Preferably, according to a twelfth aspect, the synchronizing device further comprises a tail signal generating portion which outputs a certain signal when the extraction signal outputted from the pattern selecting portion corresponds to the extraction signal just preceding the candidate or the definite head word.

According to the device of the first aspect, the position of the head word, i. e. the position of a break of packets is determined on the basis of the synchronizing code and the correctness of the position of the break is verified on the basis of the frequency as to whether or not the synchronizing code repeatedly appears in the head words. A new position of the break is always searched for in the asynchronous state and the position of the break is defined and not changed in the synchronous state. It is determined on the basis of the processing number generated by the processing number generating portion whether the extraction signal corresponds to the head word, which eliminates the necessity for the FIFO for storing data for one packet required in conventional devices. This allows reduction of the number of elements forming the device, realizing size reduction and manufacturing cost reduction of the device.

According to the device of the second aspect, in the asynchronous state, the processing number goes back to the certain value every time the extraction signal agrees with the synchronizing code. When the processing number goes back to the certain value via the preceding value, it is determined that the extraction signal corresponds to a candidate for the head word or to a definite head word. This eliminates the necessity for a memory for storing the position of the candidate for the head word or the definite head word. That is to say, the device can be constructed most simply.

According to the device of the third aspect, in the asynchronous state, a processing number associated with the extraction signal set as a candidate for the head word is stored as a tag and then the stored tag and the processing number are compared with each other to determine whether the extraction signal corresponds to the candidate for the head word. Accordingly, it is possible to find a correct candidate to shift to the synchronous state even if a plurality of synchronizing codes appear in the length of one packet.

According to the device of the fourth aspect, the storage space for storing the tags requires a storage capacity A times the bit length capable of representing a value of P. That is to say, the required storage capacity is much smaller than the storage capacity of P×L bits required in the FIFO in conventional devices. Particularly, when processing packets adapted to the MPEG standard, the number A can actually be much smaller (=several) than the number P (=204), and therefore the required storage capacity can practically be neglected, compared with the FIFO in conventional devices.

According to the device of the fifth aspect, the storage space for storing the tags requires a storage capacity of P bits. That is to say, the required storage capacity is much smaller than the storage capacity of P×L bits required in the FIFO in conventional devices. Particularly, when the number P is small, this structure is more advantageous than that of the fourth aspect.

According to the device of the sixth aspect, the determination as to whether it corresponds to the asynchronous state or the synchronous state is made on the basis of the lock level increasing and decreasing according to results of verification of the correctness of breaks of packets, i. e. a variable which numerically represents the possibility of the correctness of breaks of packets. This allows synchronization with less errors to be effectively performed with a reduced waste time.

According to the device of the seventh aspect, the preceding extraction signal is intactly outputted in the resting period. This avoids input of unnecessary data into a device, e.g., a decoder, following after the synchronizing device, thus avoiding malfunction of the device.

According to the device of the eighth aspect, pulses which rest in the resting period and are synchronized with output of the extraction signal in the other period are outputted as a clock signal. A device, such as a decoder, connected after the synchronizing device is constructed to operate in synchronization with this clock signal, which enables normal processing, such as decoding, without malfunction.

According to the device of the ninth aspect, a signal for informing the resting period is outputted. This signal allows a device, e.g., a decoder, following after the synchronizing device to operate while distinguishing the resting period and the other period.

According to the device of the tenth aspect, the synchronizing code is always outputted as the definite head word in the synchronous state, independently of the value of the extraction signal. If the synchronizing code does not appear in the head word in the synchronous state, it is highly possible that an error is occurring in the input data signal for some reason. This device provides the correct value with the error corrected.

According to the device of the eleventh aspect, a head signal for informing output of the head word of a packet is outputted, which allows a device, such as a decoder, connected after the synchronizing device to operate while distinguishing the period in which the head word is inputted and the other period.

According to the device of the twelfth aspect, the tail signal for informing output of the tail word of the packet is outputted, which allows a device, such as a decoder, connected after the synchronizing device to recognize the appearance of a break of packets just prior to it, so as to perform certain operation corresponding to the appearance of the break.

Thus, it is an object of the present invention to provide a synchronizing device which requires no FIFO to reduce the number of components to realize size reduction and manufacturing cost reduction of the device.

These and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a block diagram showing the synchronization detecting portion in FIG. 18.

FIG. 29 is a block diagram showing a synchronization detecting portion according to a second preferred embodiment.

DESCRIPTION OF THE PREFERRED EMBODIMENTS

<1. Outline>

Figure 1:
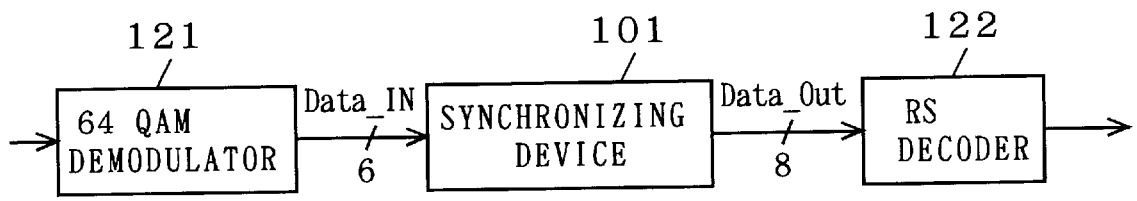
FIG. 1 is a block diagram showing an example of use of a device of the referred embodiments.

FIG. 1 is a block diagram showing an example of use of a synchronizing device according to preferred embodiments described later. In this example, the synchronizing device 101 is interposed between a 64 QAM demodulator 121 and a RS (Reed Solomon) type decoder 122. These devices process, for example, data signal coded on the basis of the MPEG standard, a representative standard in moving picture compression technology.

Figure 2:
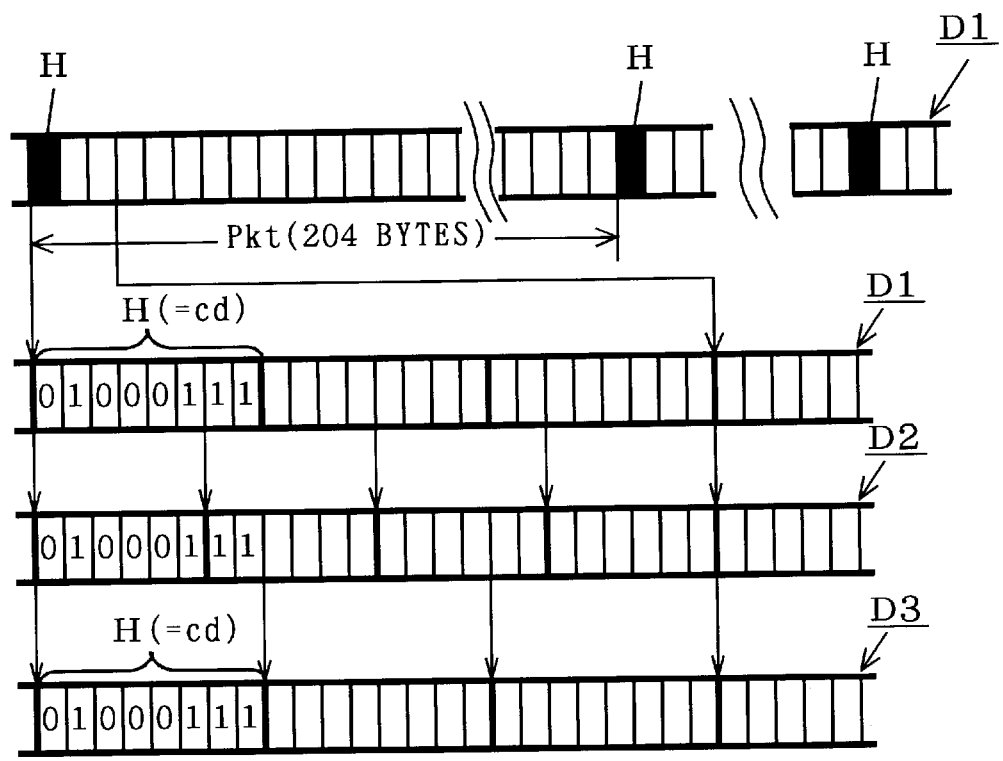
FIG. 2 is an explanation drawing showing the outline of the operation of the device of the preferred embodiments.

FIG. 2 is an explanation drawing showing the outline of the operation of the device shown in FIG. 1. A data signal D1, obtained by coding picture data on the basis of the MPEG standard, is formed of units called "packets" each including a certain number of pieces of data. The packet Pkt is formed as a sequence of 8-bit (=1 byte) unit data, each packet Pkt including 204 pieces of unit data. A synchronizing code Cd as an indicator for identification is assigned to the unit data located at the head of one packet Pkt (i.e., immediately after a break of packets Pkt), i.e., a head word H. The synchronizing code Cd is set at a value "47" in hexadecimal notation (="01000111" in binary notation, which may be expressed as "8'h47"), for example.

The data signal D1 is modulated by a 64 QAM-type modulator not shown and then sent onto the transmission path. The signal received through the transmission path is demodulated in the demodulator 121 (FIG. 1). In contrast to the original data signal D1, the data signal D2 outputted from the demodulator 121 is formed as a sequence of 6-bit-long unit data.

The data signal D2 is equivalent to a version in which the data sequence of the data signal D1 is re-separated by six bits. That is to say, in the data signal D2, a piece of 8-bit-long unit data forming the packet Pkt of the data signal D1 is assigned over a plurality of 6-bit-long unit data. For example, as shown in FIG. 2, the synchronizing code Cd (=47) assigned to the head word H in one packet Pkt in the data signal D1 extends over two adjacent unit data in the data signal D2.

The function of the synchronizing device 101 resides in synchronizing, or in reconfiguring the data signal D1 from the data signal D2. The device 101 finds the head word H in a packet Pkt from the data signal D2 by utilizing the synchronizing code Cd to reconfigure the data signal D1 formed of a sequence of packets Pkt. The reconfigured data signal D1 is sent from the device 101 to the decoder 122 as a data signal D3. The decoder 122 decodes the data signal D3 to recover the picture data before coded.

The synchronizing device of the invention generally converts a data signal formed of a sequence of $m(\geq 1)$-bit-long unit data into a data signal formed of a sequence of $L(>m)$-bit-long unit data to reconfigure a packet-format data signal. Described later in the preferred embodiments are examples of handling the MPEG standard data signal D1 shown in FIG. 2, i.e., examples in which the data signal D2 formed of a sequence of 6-bit-long unit data is converted into the data signal D3 formed of a sequence of 8-bit-long unit data (examples in which m=6 and L=8).

However, it is possible to similarly construct synchronizing devices adapted to D general combinations of m and L (>m).

<2. First Preferred Embodiment>

Figure 3:
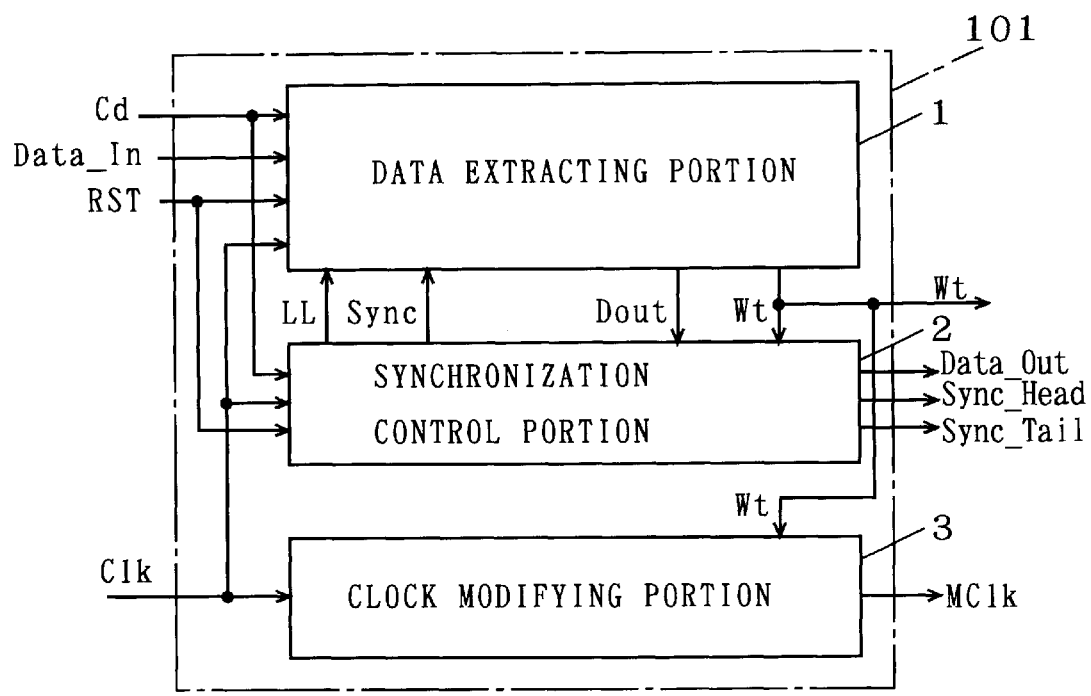
FIG. 3 is a block diagram showing the entirety of the device of a first preferred embodiment.

FIG. 3 is a block diagram showing the entire structure of a synchronizing device 101 according to a first preferred embodiment. This device 101 includes a data extracting portion 1, a synchronization control portion 2, and a clock modifying portion 3. The device 101 is fed with an input data signal Data_In, a clock signal Clk, a synchronizing code Cd and a reset signal RST.

The input data signal Data_In is a data signal corresponding to the data signal D2 shown in FIG. 2, or a data signal formed of a sequence of 6-bit-long unit data. The clock signal Clk is a clock signal inputted in synchronization with the 6-bit-long unit data included in the input data signal Data_In. That is to say, one pulse is inputted as the clock signal Clk each time 6-bit-long unit data is inputted as the input data signal Data_In.

The synchronizing code Cd is a fixed value set from the demodulator 121 to the device 101 at the beginning of processing, for example, depending on the type of the data subjected to the processing. For example, when the coded data based on MPEG shown in FIG. 2 is a target of the processing, a value of "47" is provided as the synchronizing code Cd. The reset signal RST is a signal inputted with a reset operation by an operator, for example, which functions as a signal instructing initialization of states of portions of the device 101.

The device 101 operates on the basis of these input signals to output an output data signal Data_Out, a wait state indication signal Wt, a modified clock signal MClk, a synchronizing signal Sync, a head signal Sync_Head, and a tail signal Sync_Tail as output signals. The output data signal Data_Out corresponds to the data signal D3 shown in FIG. 2, or a data signal formed of a sequence of 8-bit-long unit data and having the format of packets Pkt.

The data extracting portion 1 sequentially extracts 8-bit-long unit data forming the packets Pkt from the input data signal Data_In in synchronization with the pulses of the clock signal Clk and sends out the data to the synchronization control portion 2 as an extraction signal Dout. The data extracting portion 1 also outputs the wait state indication signal Wt indicating a state of a temporary pause in the extraction, or "a wait state," in a periodically coming un-extractable clock cycle (one cycle of the clock signal Clk).

The synchronization control portion 2 is a portion mainly serving to control the data extracting portion 1, which, particularly, calculates a lock level LL which is a variable for representing the level of possibility of a synchronous state and a synchronizing signal Sync for indicating a break of packets Pkt, and outputs the signals to the data extracting portion 1. The data extracting portion 1 performs the extracting operation on the basis of the lock level LL and the synchronizing signal Sync. The synchronization control portion 2 also outputs a head signal Sync_Head indicating the head of a packet Pkt, and a tail signal Sync_Tail indicating the tail of a packet Pkt, and also outputs the extraction signal Dout as the output data signal Data_Out depending on the value of the wait state indication signal Wt.

The clock modifying portion 3 generates the modified clock signal MClk on the basis of the clock signal Clk and the wait state indication signal Wt. The modified clock signal MClk is a clock signal lacking in pulse in periods in which the clock cycle is in the "wait state," or in periods in which the wait state indication signal Wt is active. That is to say, the pulse of the modified clock signal MClk is outputted every time effective data forming the packet Pkt is outputted as the output data signal Data_Out. The output signals Wt, Sync_Head, Sync_Tail, and MClk are supplied to the decoder 122 together with the output data signal Data_Out.

<2-1. Data Extracting Portion>

Figure 4:
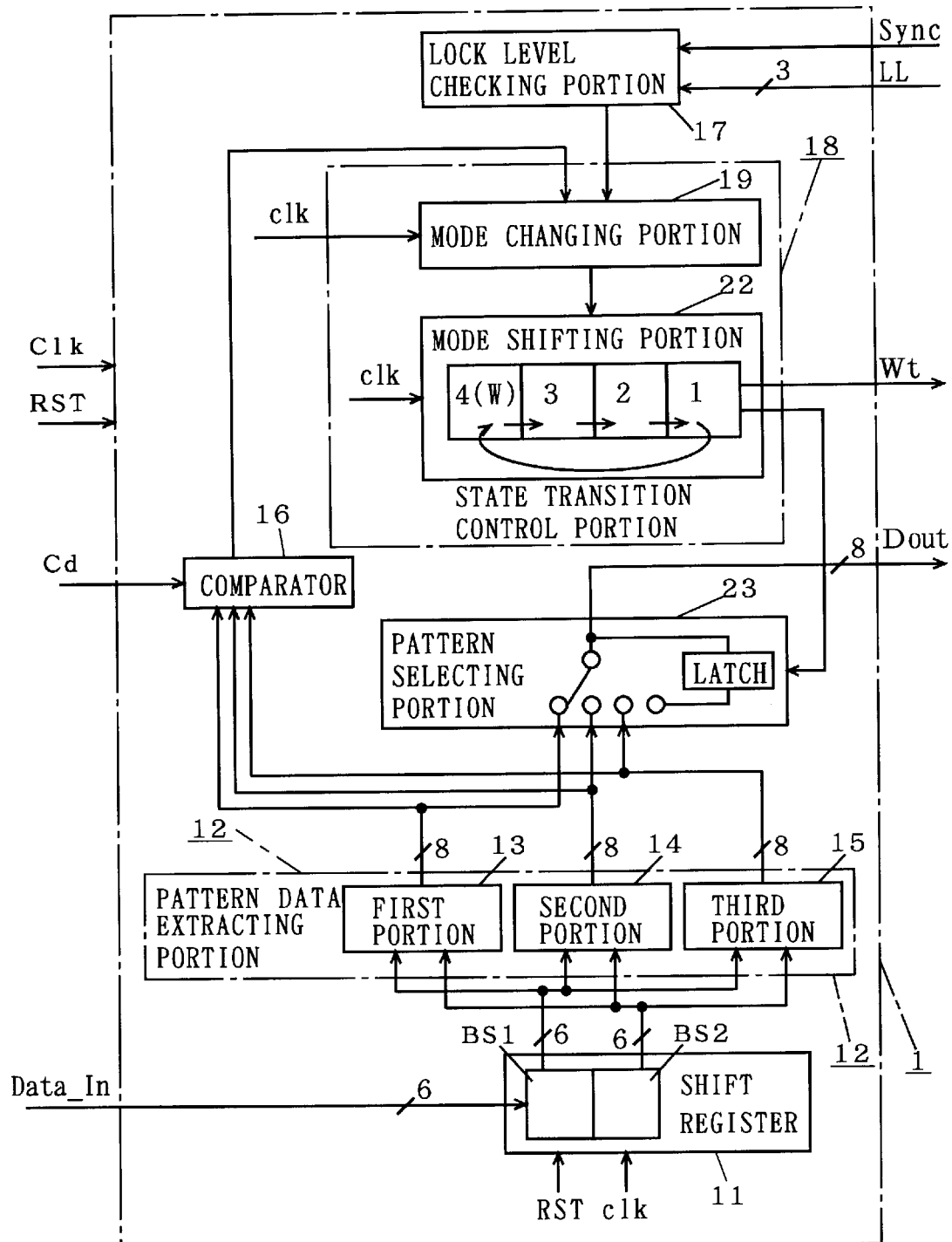
FIG. 4 is a block diagram showing the data extracting portion shown in FIG. 3.

FIG. 4 is a block diagram showing the structure of the data extracting portion 1. The data extracting portion 1 includes a shift register 11, a pattern data extracting portion 12, a comparator portion 16, a lock level checking portion 17, a state transition control portion 18, and a pattern selecting portion 23. The state transition control portion 18 includes a mode changing portion 19 and a mode shifting portion 22.

The shift register 11 includes buffers BS1 and BS2 connected in two stages. The buffers BS1 and BS2 each have a storage capacity of 6 bits. The data signal stored in each of the buffers BS1 and BS2 is outputted to the pattern data extracting portion 12. The input data signal Data_In, the clock signal Clk and the reset signal RST are inputted as input signals to the shift register 11, on the basis of which the shift register 11 operates.

Figure 5:
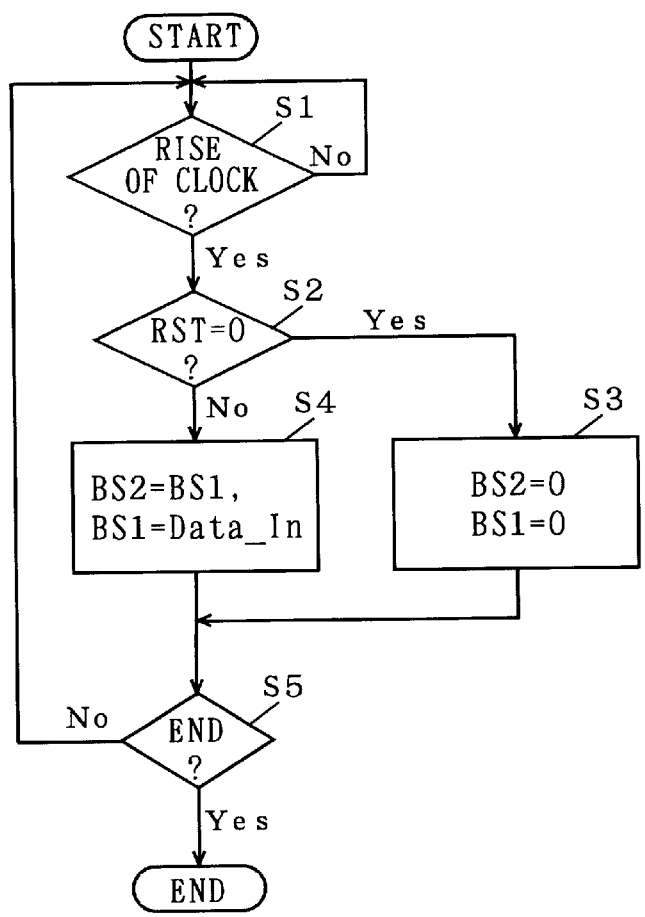
FIG. 5 is a flow chart showing the operation of the shift register shown in FIG. 4.

FIG. 5 is a flow chart showing the flow of operation of the shift register 11. When the shift register 11 starts operating, it is first determined in step S1 whether the pulse of the clock signal Clk rises. The processing in step S1 is repeated until a rise is obtained, and when a rise is obtained, the process shifts to step S2. That is to say, step S1 adjusts timing so that the processing in and after step S2 is started in synchronization with a leading edge of the clock signal Clk.

In step S2, it is determined whether the reset signal RST is active (the value "0" in the example below). When the reset signal RST is active, the reset processing in step S3 is performed. That is to say, values stored in each bit in both of the buffers BS1, BS2 are set to "0." When the reset signal RST is normal (or the value "1"), the normal processing is performed in step S4. That is to say, 6-bit-long unit data stored in the buffer BS1 is written into the buffer BS2 and 6-bit-long unit data of the input data signal Data_In is written into the buffer BS1. That is to say, the buffers BS1, BS2 perform shifting operation.

When the processing in step S3 or S4 ends, it is determined in step S5 whether to terminate the processing. When it is determined that the processing is to be terminated, that is, when a communication is finished, or when the power-supply is to be turned off, for example, the processing is terminated. When it is determined that the processing is not to be terminated, the processing returns to step S1. In this way, the processing loop in steps S1–S5 is repeatedly performed until a determination is made to terminate the processing.

<2-2. Pattern Data Extracting Portion>

Referring to FIG. 4 again, the pattern data extracting portion 12 includes first to third pattern data extracting portions 13, 14, 15. The first to third pattern data extracting portions 13, 14, 15 are each fed with the data signal stored in the two buffers BS1, BS2.

Figure 6:
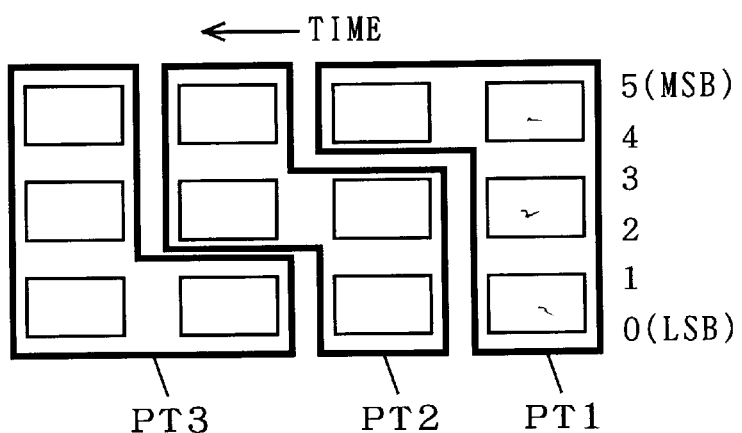
FIG. 6 is a schematic diagram showing patterns of assignment of the unit data.

FIG. 6 is an explanation drawing showing patterns in which 8-bit-long unit data in a packet Pkt is assigned in the input data signal Data_In formed as a sequence of 6-bit unit data. As shown in FIG. 6, the input data signal Data_In includes unit data of 6 bits from the 0th bit corresponding to the least significant bit (LSB) to the fifth bit corresponding to the most significant bit (MSB) arranged long the time base. The patterns of assignment of the 8-bit-long unit data in the input data signal Data_In include the three patterns PT1, PT2, PT3 shown in FIG. 6.

All of the patterns PT1, PT2, PT3 exist over two adjacent 6-bit-long unit data. The pattern PT1 is formed of all of the 0th to fifth bits of one unit data and the fourth and fifth bits in the next unit data. The pattern PT2 is formed of the 0th to third bits of one unit data and the second to fifth bits in the next unit data. The pattern PT3 is formed of the 0th and first bits in one unit data and all of the 0th to fifth bits in the next unit data.

The 8-bit-long unit data in a packet Pkt are assigned closely (without empty bits) in the input data signal Data_In in the order of patterns PT1, PT2, PT3, PT1, PT2, . . . Then the first to third pattern data extracting portions 13, 14, 15 extract 8-bit data corresponding to the patterns PT1, PT2, PT3 from two unit data of the input data signal Data_In stored in the buffers BS1, BS2.

Figure 7:
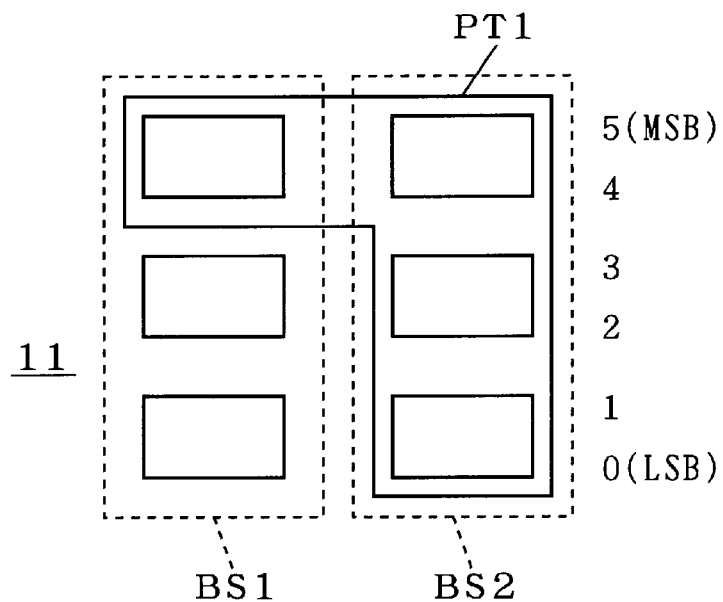
FIG. 7 to FIG. 9 are explanation drawings showing the operation of the pattern data extracting portion in FIG. 4.
Figure 8:
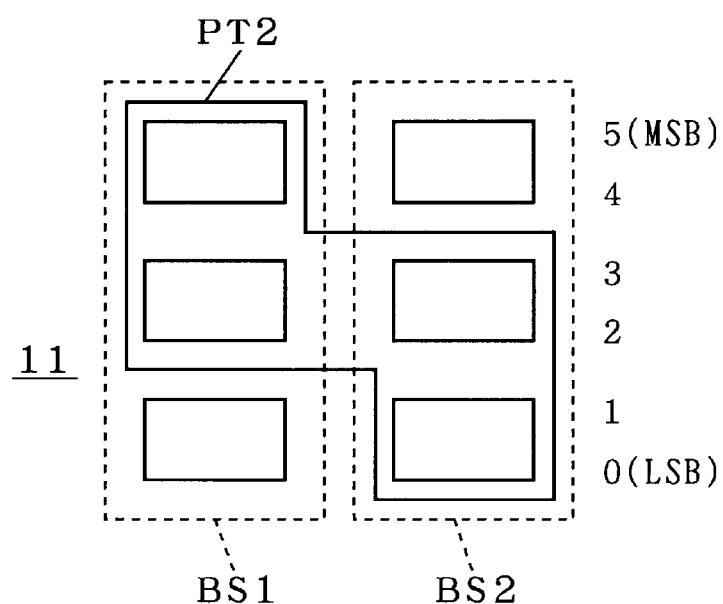
Figure 9:
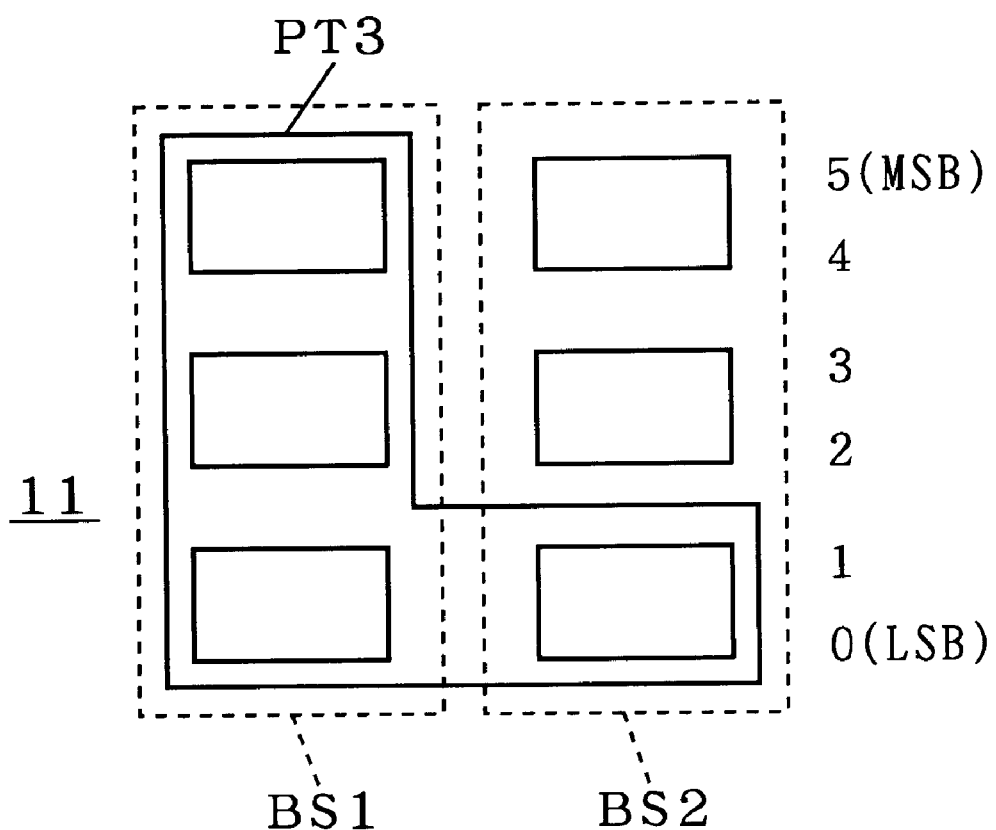

That is to say, the first pattern data extracting portion 13 extracts, as shown in FIG. 7, 8-bit data corresponding to the pattern PT1 from adjacent two 6-bit-long unit data stored in the buffers BS1, BS2. As shown in FIG. 8, the second pattern data extracting portion 14 extracts 8-bit data corresponding to the pattern PTT2 from adjacent two 6-bit-long unit data stored in the buffers BS1, BS2. Similarly, as shown in FIG. 9, the third pattern data extracting portion 15 extracts 8-bit data corresponding to the pattern PT3.

Needless to say, the 8-bit data extracted by the first to third pattern data extracting portions 13, 14, 15 include, at most, one piece of true 8-bit-long unit data worth extracting. That is to say, the first to third pattern data extracting portions 13, 14, 15 extract all possible candidates for 8-bit-long unit data assigned to the two rows of 6-bit-long unit data stored in the buffers BS1, BS2. The 8-bit data extracted by the first to third pattern data extracting portions 13, 14, 15 are sent to the comparator portion 16 and the pattern selecting portion 23.

<2-3. State Transition Control Portion and Others>

Figure 10:
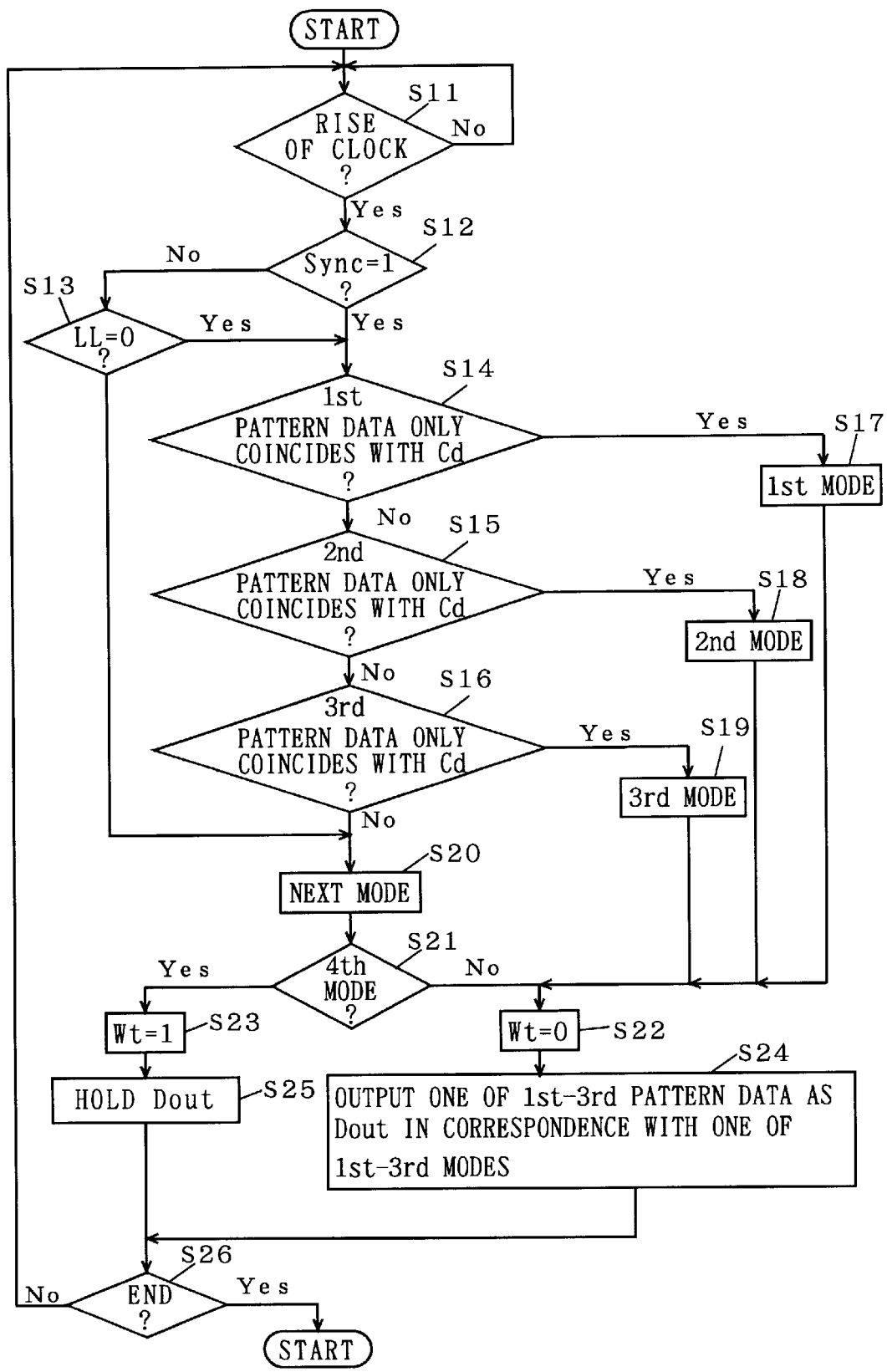
FIG. 10 is a flow chart showing the operation of the state transition control portion and the like shown in FIG. 4.
Figure 11:
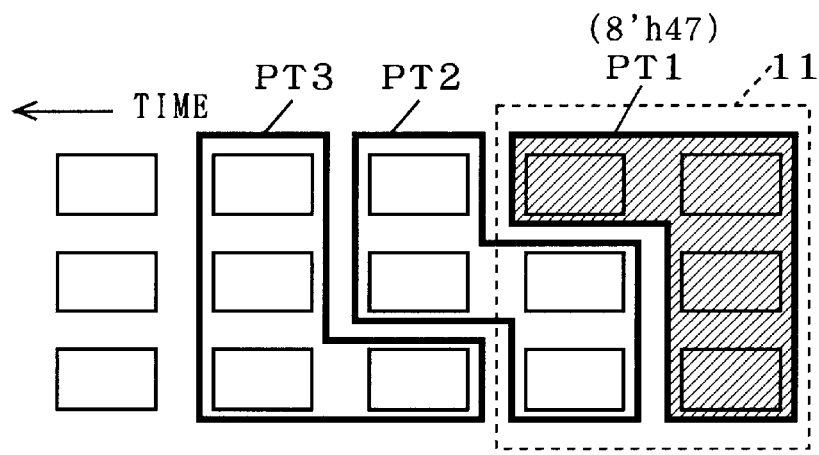
FIG. 11 to FIG. 13 are explanation drawings showing operation of the comparator portion in FIG. 4.
Figure 12:
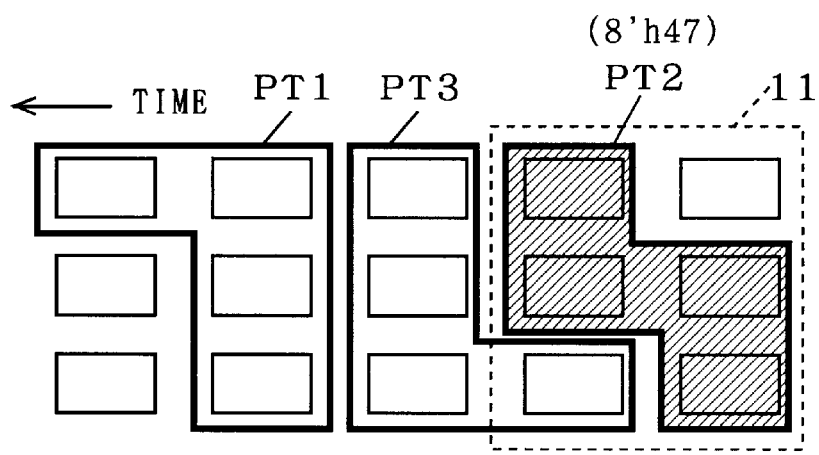

FIG. 10 is a flow chart showing the flow of operation of the comparator portion 16, the lock level checking portion 17, the state transition control portion 18, and the pattern selecting portion 23. This operating flow has steps S11 and S26 respectively corresponding to steps S1 and S5 in the operating flow of the shift register 11 shown in FIG. 5. The processing loop of steps S11–S26 is repeatedly executed until a determination is made to terminate the processing. The processing in and after step S12 is started in synchronization with a leading edge of the clock signal Clk.

The comparing processing in steps S12 and S13 is conducted by the lock level checking portion 17. In these steps S12, S13, the values of the synchronizing signal Sync and the lock level LL sent from the synchronization control portion 2 are individually compared with certain values. The comparing processing in steps S14–S16 is achieved by the comparator portion 16. In these steps S14–S16, the data of the patterns PT1–PT3 extracted by the first to third pattern data extracting portions 13–15 are compared with the synchronizing code Cd.

In accordance with the results of the comparison, the state transition control portion 18 determines the mode in the processing in and after step S17. The mode, as will be explained later, indicates the type of the selecting operation in the pattern selecting portion 23 (FIG. 4), which defines four, first to fourth modes.

When the synchronizing signal Sync is active (the value "1" in the example), i.e., when the clock cycle corresponds to a break of packets Pkt, or when the lock level LL is "0," i.e., when the device is in an asynchronous state before attaining the synchronous state, the results of comparison in steps S14–S16 are referred to, according to which any of steps S17–S20 is selectively executed. When the clock cycle does not correspond to a break of packets Pkt and the lock level LL has a value of "1" or larger corresponding to the synchronous state, the results of comparison in steps S14–S16 are not referred to, and the processing in step S20 is executed.

If it is determined in the comparing processing in steps S14–S16 that only one of the three patterns PT1, PT2, PT3 coincides with the synchronizing code Cd, the mode is set to corresponding one of first to third modes in steps S17–S19 independently of the current mode. This processing is executed by the mode changing portion 19 in the state transition control portion 18.

If it is determined in the comparing processing in steps S14–S16 that none of the data of the three patterns PT1, PT2, PT3 coincides with the synchronizing code Cd, or that two or more of them coincide with it, the mode is shifted from the current mode to the next mode in step S20. The same operation is done when the comparison processing in steps S14–S16 is not referred to. Shifting the mode means cyclically shifting the mode one by one in the order of first, second, third, fourth, first, second, . . .

When the processing in step S20 is ended, the process moves to step S21 to determine whether the new mode is the fourth mode. If it is not the fourth mode, the wait state indication signal Wt is set to normal (the value "0" in the example below) in step S22. If it is determined to be the fourth mode, the wait state indication signal Wt is set to active (the value "1") in step S23. When the processing passes through any of steps S17–S19, the new mode is not the fourth mode. Accordingly the processing in step S22 is executed. The processings in steps S20–S23 are executed by the mode shifting portion 22 in the state transition control portion 18.

When the process passes through step S22, the processing in step S24 is executed. That is to say, one of the data of the patterns PT1, PTT2, PT3 is selected corresponding to the newly set one of first to third modes and outputted as the extraction signal Dout. When the process passes through step S23, the processing in step S25 is performed. That is to say, the current extraction signal Dout is held as it is without updated. When processing in one of steps S24 and S25 is ended, the process moves to step S26.

The processing in steps S24 and S25 is achieved by the pattern selecting portion 23. Accordingly, as schematically shown in FIG. 4, the pattern selecting portion 23 can be constructed as a switching circuit for selecting and outputting one of the output signals from the first to third pattern data extracting portions 13, 14, 15 or the current value held in the latch in response to the mode signal outputted from the mode shifting portion 22, i. e. a signal representing the mode.

FIG. 11–FIG. 17 are explanation drawings showing the relation between the extraction signal Dout selected on the basis of the operating flow of FIG. 10 and the input data signal Data_In. Explained first is an example in which, when a certain clock cycle is in the asynchronous state (the lock level LL=0) or when the clock cycle corresponds to a break of packets Pkt (the synchronizing signal Sync=1), only the pattern PT1 in the three extracted patterns PT1, PT2, PT3 for two rows of unit data stored in the shift register 11 coincides with the synchronizing code Cd, that is, an example corresponding to the state shown in FIG. 11, and not to those shown in FIG. 12 and FIG. 13.

Figure 14:
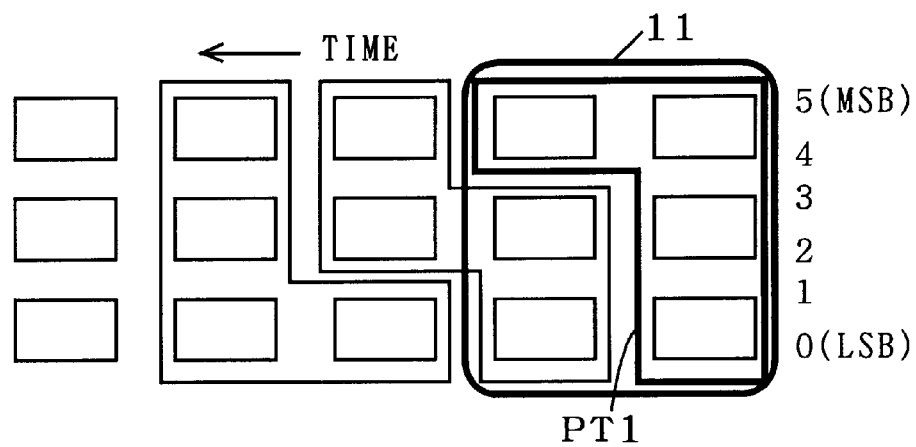
FIG. 14 to FIG. 17 are explanation drawings showing the operation of the state transition control portion in FIG. 4.
Figure 15:
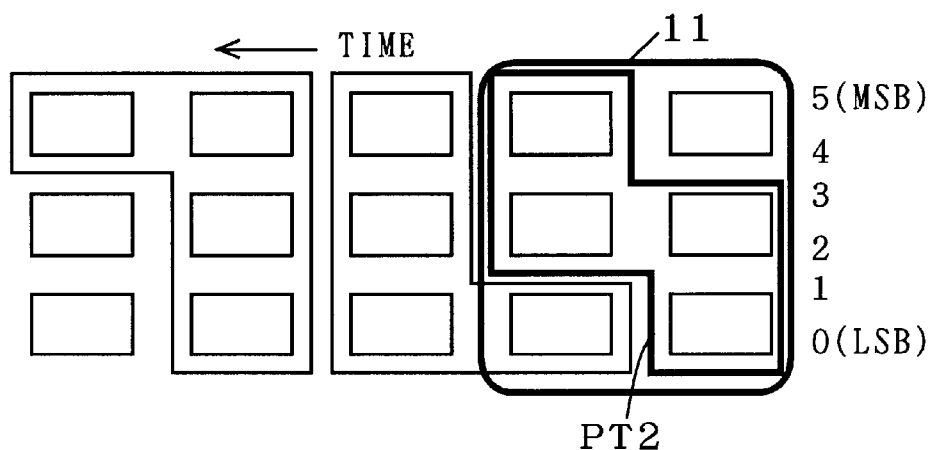
Figure 16:
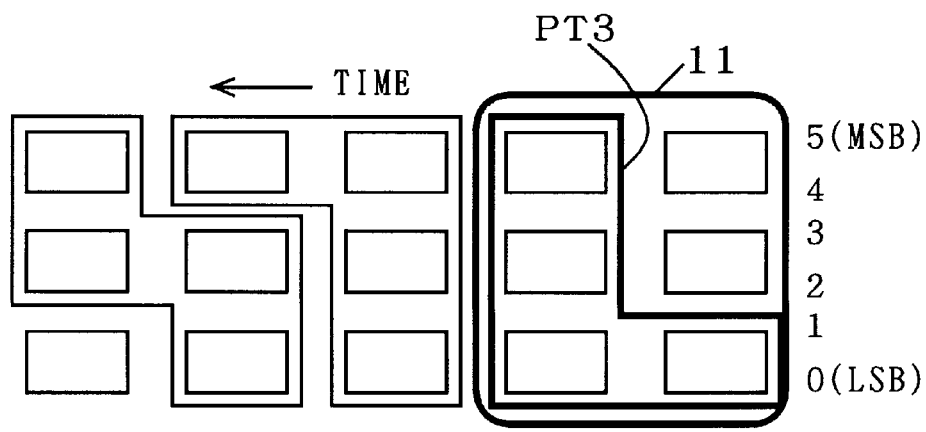

In this case, the mode is set to the first mode in that clock cycle and therefore the data of the pattern PT1 shown in FIG. 14 (which coincides with the synchronizing code Cd) is outputted as the extraction signal Dout. This means the determination that 8-bit-long unit data in the packet Pkt is assigned to the input data signal Data_In in the form of the pattern PT1 in this clock cycle and that the value corresponds to the synchronizing code Cd.

If this determination is correct, the 8-bit-long unit data must be assigned in the order of the patterns PT2, PT3, PT1, PT2, . . . after that. Correspondingly, the mode is sequentially shifted to the second, the third mode, every time the clock cycle advances by one (in other words, every time the clock signal Clk rises), and data outputted as the extraction signal Dout is correspondingly shifted to data of the patterns PT2, PT3 shown in FIG. 15 and FIG. 16.

Figure 17:
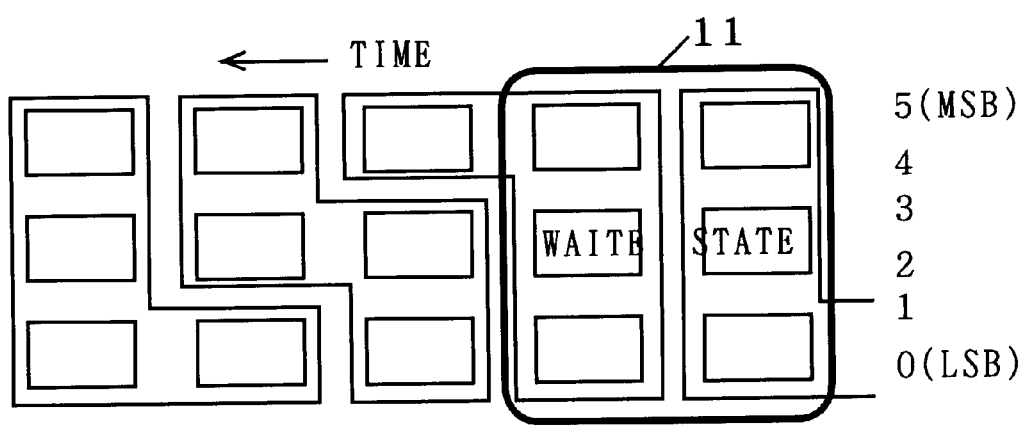

In the next clock cycle, as shown in FIG. 17, no data to be correctly extracted exists in the shift register 11. At this time, the mode has been shifted to the fourth mode, where none of the data of patterns PT1, PT2, PT3 extracted from the shift register 11 is selected as the extraction signal Dout and the value of the extraction signal Dout in the preceding clock cycle is maintained. That is to say, the data extracting portion 1 is placed into a temporary resting state, i.e., the "wait state" in this clock cycle. The wait state indication signal Wt becomes active only in the "wait state." That is to say, the wait state indication signal Wt functions as a signal indicating the "wait state."

In the next clock cycle, the mode returns to the first mode and the data of the pattern PT1 shown in FIG. 14 is outputted as the extraction signal Dout. Needless to say, at this time, the data of the pattern PT1 is generally not the synchronizing code Cd. Subsequently, as the mode cyclically and serially shifts among the first to fourth modes for each clock cycle, the four states, or the selections of the patterns PT1, PT2, PT3 and the "wait state," are sequentially developed.

This shift operation is repeatedly continued until an asynchronous state appears (the lock level LL goes "0") or until the clock cycle reaches a break of packets Pkt (the synchronizing signal Sync goes "1"). When the lock level LL goes "0" or the synchronizing signal Sync goes "1," it is determined which of FIG. 11–FIG. 13 it corresponds to. If it is determined that the state corresponds only to FIG. 12, for example, the mode is changed to the second mode independently of the current mode, and subsequently, the mode is cyclically shifted in the order of third, fourth, first, second, third modes.

Figure 13:
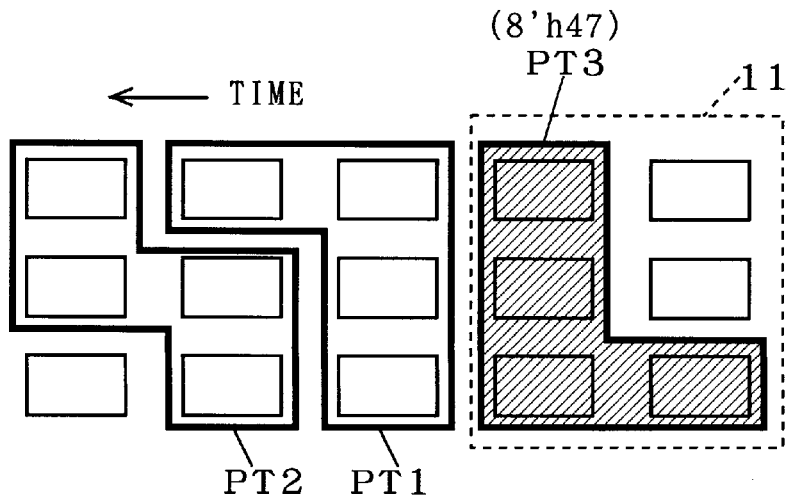

If it is determined that it corresponds only to FIG. 13, the mode is changed to the third mode and then is cyclically shifted in the order of the fourth, first, second, third, fourth modes. If it corresponds to none of FIG. 11 to FIG. 13 or if it corresponds to a plurality of them, the circulative shift operation is maintained unchanged.

That is to say, in normal operation, operations of the first to fourth modes corresponding to the selections of the patterns PT1, PT2, PT3 and the "wait state" are cyclically developed in this order. When the lock level LL goes "0" or the synchronizing signal Sync goes "1," and only one of the data of the patterns PT1, PT2, PT3 coincides with the synchronizing code Cd, the mode jumps to one of the first to third modes in accordance with the result.

The 8-bit-long unit data forming a packet Pkt are assigned without vacancy in the input data signal Data_In in the order of the patterns PT1, PT2, PT3, PT1, PT2 . . . on the basis of the position of certain 6-bit-long unit data. The possible orders in which the data extracting portion 1 extracts a sequence of 8-bit-long unit data from the input data signal Data_In include the following three orders: the correct pattern PT1, PT2, PT3, PT1, PT2, . . . , and the incorrect two orders, the order of patterns PT2, PT3, PT1, PT2, PT1, . . . and the order of patterns PT3, PT1, PT2, PT1, PT2, . . .

Jumping the mode to one of the first to third modes in accordance with the result of comparison between the data of the patterns PT1, PT2, PT3 and the synchronizing code Cd corresponds to the operation of selecting one of the three orders as the order of following extraction, on the basis of to which of the three patterns PT1, PT2, PT3 the synchronizing code Cd read from the input data signal Data_In is assigned. At this time, the order including the pattern to which the synchronizing code Cd is assigned is selected. Continuously shifting the mode without jumping in the normal period corresponds to the operation of continuing extraction in the selected order.

An order once selected is not always the correct order. In the input data signal Data_In, 8-bit data extracted in a pattern other than the correct one of the three patterns PT1, PT2, PT3 may have the same value as the synchronizing code Cd by chance. It is for the purpose of enabling correction to the correct order when the selected extraction order is wrong that the mode jumps to one of the first to third modes on the basis of the synchronizing code Cd when the device is in the asynchronous state or when it is determined that a break of packets Pkt is reached.

<2-4. Synchronization Control Portion and Synchronization Detecting Portion>

Figure 18:
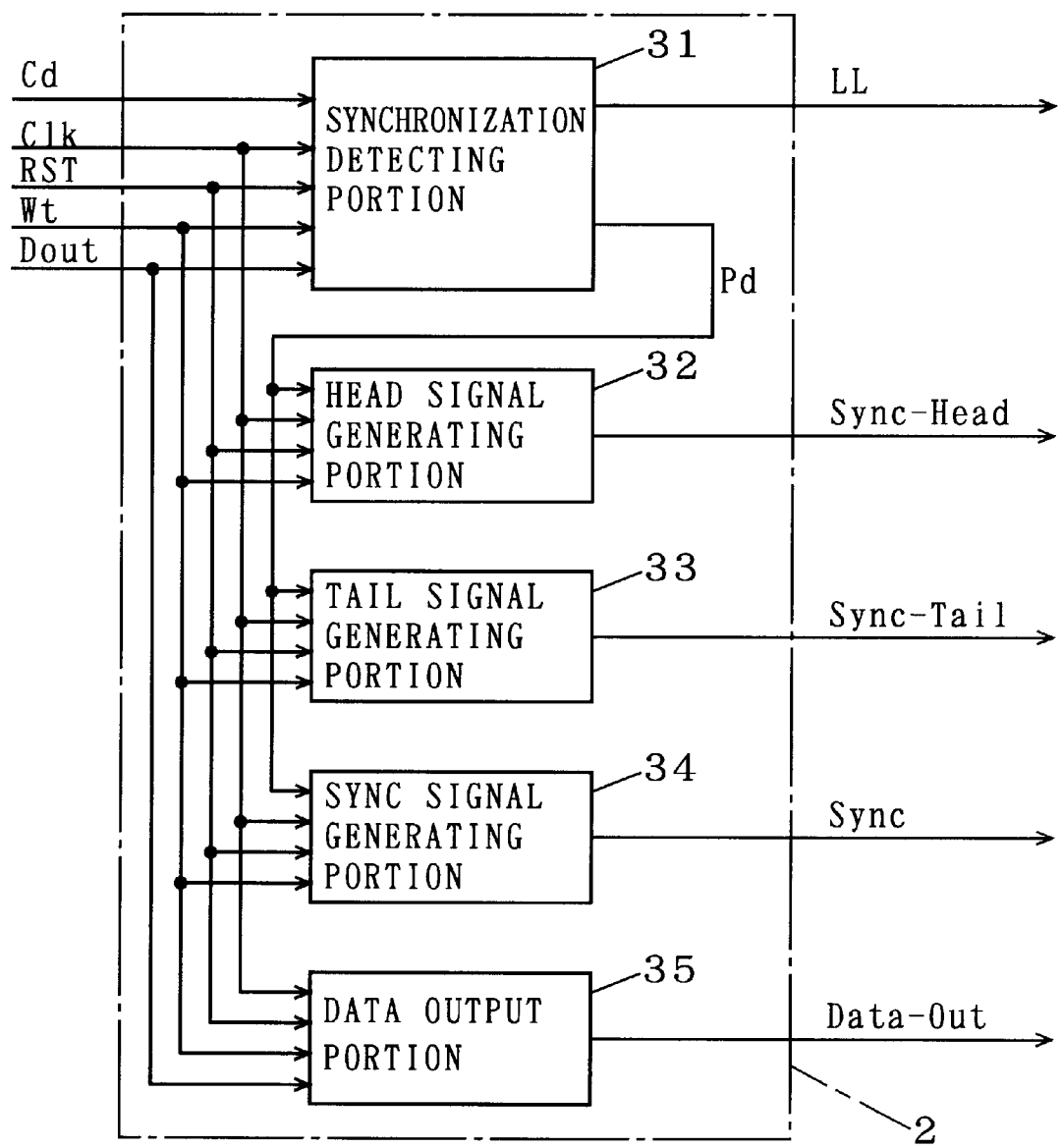
FIG. 18 is a block diagram showing the synchronization control portion shown in FIG. 3.

FIG. 18 is a block diagram showing the structure of the synchronization control portion 2. The synchronization control portion 2 includes a synchronization detecting portion 31, a head signal generating portion 32, a tail signal generating portion 33, a synchronizing signal generating portion 34 and a data output portion 35. The synchronization detecting portion 31 and the lock level checking portion 17 (FIG. 4) form a synchronization determining portion of the invention.

The synchronization control portion 2 is fed with, as input signals, the synchronizing code Cd, the clock signal Clk, the reset signal RST, the wait state indication signal Wt, and the extraction signal Dout. The wait state indication signal Wt and the extraction signal Dout are supplied from the data extracting portion 1. The synchronization detecting portion 31 calculates the lock level LL referred to in the data extracting portion 1 and also calculates a processing number Pd referred to in the head signal generating portion 32. The head signal generating portion 32, the tail signal generating portion 33 and the synchronizing signal generating portion 34 generate and output the head signal Sync_Head, the tail signal Sync_Tail, and the synchronizing signal Sync, respectively. The data output portion 35 outputs the output data signal Data_Out on the basis of the extraction signal Dout.

FIG. 19 is a block diagram showing the internal structure of the synchronization detecting portion 31. The synchronization detecting portion 31 includes a comparator portion 41, a lock level generating portion 42, a processing number generating portion 43, a reset determining portion 44, and a wait state determining portion 45. The lock level generating portion 42 and the lock level checking portion 17 (FIG. 4) form a state determining portion of the invention.

Figure 20:
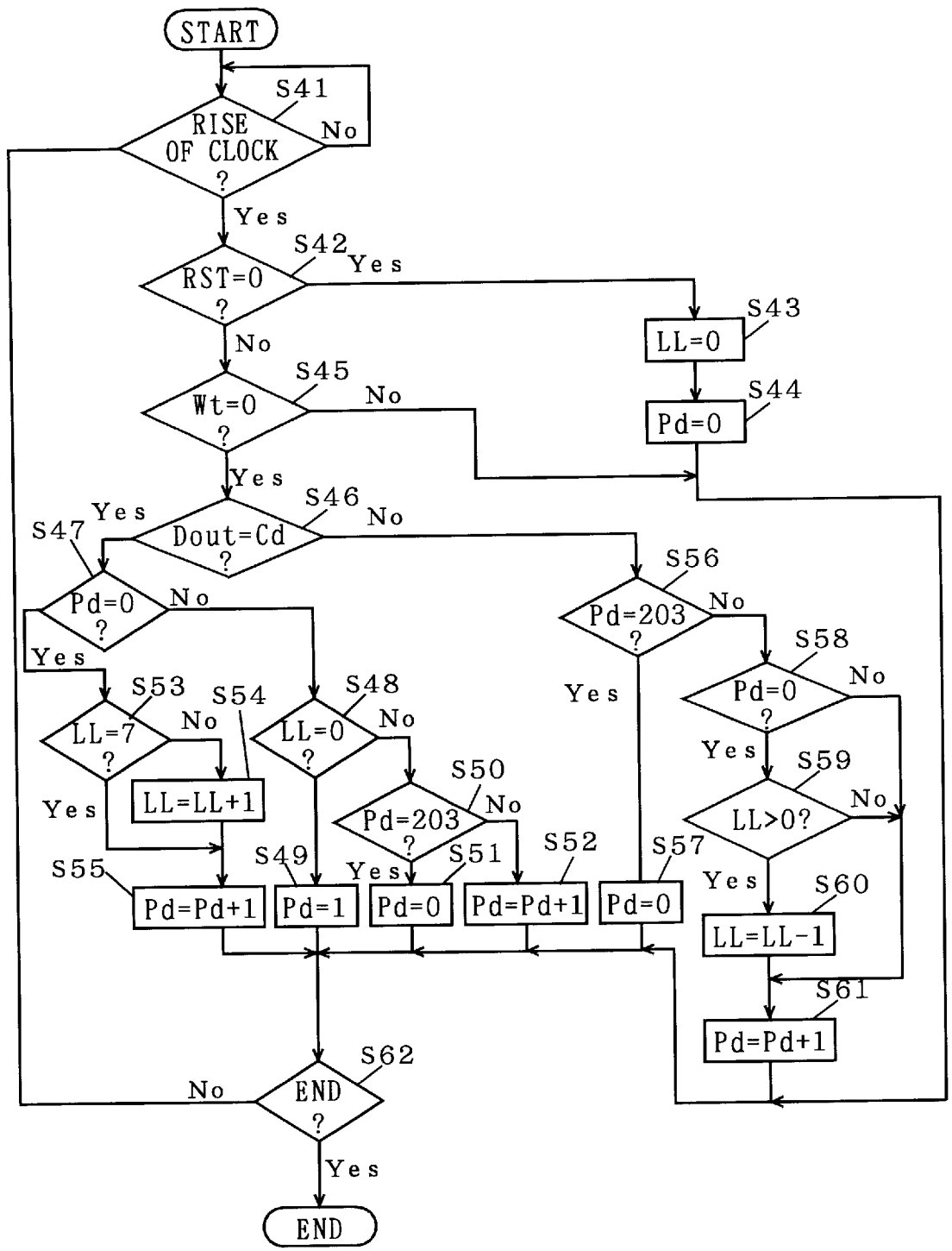
FIG. 20 is a flow chart showing the operation of the synchronization detecting portion in FIG. 19.

FIG. 20 is a flow chart showing the flow of operation of the synchronization detecting portion 31. This operation flow has steps S41, S62 respectively corresponding to steps S1, S5 in FIG. 5 showing the operation flow of the shift register 11. The processing loop in steps S41–S62 is, as well, repeatedly conducted until a determination is made to end the processing. The processing in and after step S42 is started in synchronization with a leading edge of the clock signal Clk.

In step S42, it is determined whether the reset signal RST is active ("0"). If the reset signal RST is active, the reset processing in steps S43, S44 is executed. That is to say, both of the lock level LL and the processing number Pd are set to the initial value "0." If the reset signal RST is normal ("1"), the normal processing in and after step S45 is executed.

Step S45 determines whether the wait state indication signal Wt is normal ("0"). If the wait state indication signal Wt is not normal, or when the current clock cycle is in the "wait state," the processing directly moves to step S62. That is to say, no processing is made in the "wait state."

If the wait state indication signal Wt is normal, the value of the extraction signal Dout is compared with the synchronizing code Cd in step S46. If the extraction signal Dout coincides with the synchronizing code Cd, the processing in steps S47–S55 is performed, and if it does not, the processing in steps S56–S61 is performed.

In steps S47–S55, the values of the processing number Pd and the lock level LL are updated on the basis of the current values of the processing number Pd and the lock level LL. More specifically, when the processing number Pd is "0," the processing number Pd is incremented (increased) by "1." At this time, if the lock level LL has not reached the upper limit value (the value "7" in the example), the lock level LL is incremented by "1," too.

If the processing number Pd is not "0" (that is to say, when Pd=1~203), the lock level LL and the processing number Pd are set as follows. That is to say, if the lock level LL is "0," the processing number Pd is set to "1." If the lock level LL is not "0" (i.e., LL=1~7) and the processing number Pd is not "203" (i.e., Pd=1~202), the processing number Pd is incremented by "1." When the lock level LL is not "0" (i.e., LL=1~7) and the processing number Pd is "203," the processing number Pd is returned to the initial value "0."

In steps S56–S61, the processing number Pd and the lock level LL are also updated on the basis of the current values of the processing number Pd and the lock level LL. More specifically, when the processing number Pd is not "203," the processing number Pd is incremented by "1." If the processing number Pd is "203," the processing number Pd is initialized to "0." Only when the processing number Pd is "0" and the lock level LL is not "0" (i.e., LL=1–7), the lock level LL is decremented (decreased) by "1."

When the processings mentioned above are finished, the process moves to step S62. The processing in steps S41–S62 is repeatedly executed and the processing number Pd thus changes in the range from "0" to "203" and the lock level LL changes in the range from "0" to "7." The determination as to the reset signal RST in step S42 is made in the reset determining portion 44 and the determination as to the wait state indication signal Wt in step S45 is made in the wait state determining portion 45.

The determinations as to the current value of the processing number Pd in steps S47, S50, S56, S58 and the determinations as to the current value of the lock level LL in steps S48, S53, S59 are made in the lock level generating portion 42 and the processing number generating portion 43. The processings of setting the processing number Pd in steps S44, S49, S51, S52, S55, S57, S61 are executed in the processing number generating portion 43. The processings of setting the lock level LL in steps S43, S50, S54, S60 are executed in the lock level generating portion 42.

<2-5. Example of Operation of Synchronization Detecting Portion>

Figure 21:
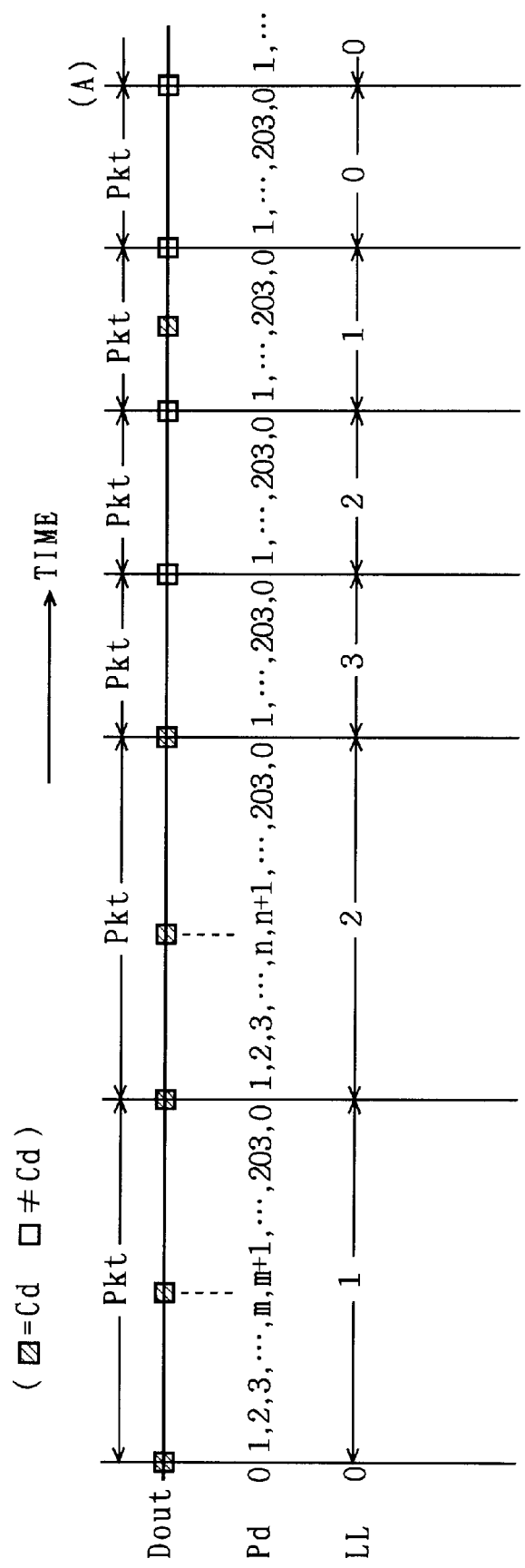
FIG. 21 and FIG. 22 are explanation drawings showing the operation of the synchronization detecting portion in FIG. 19.
Figure 22:
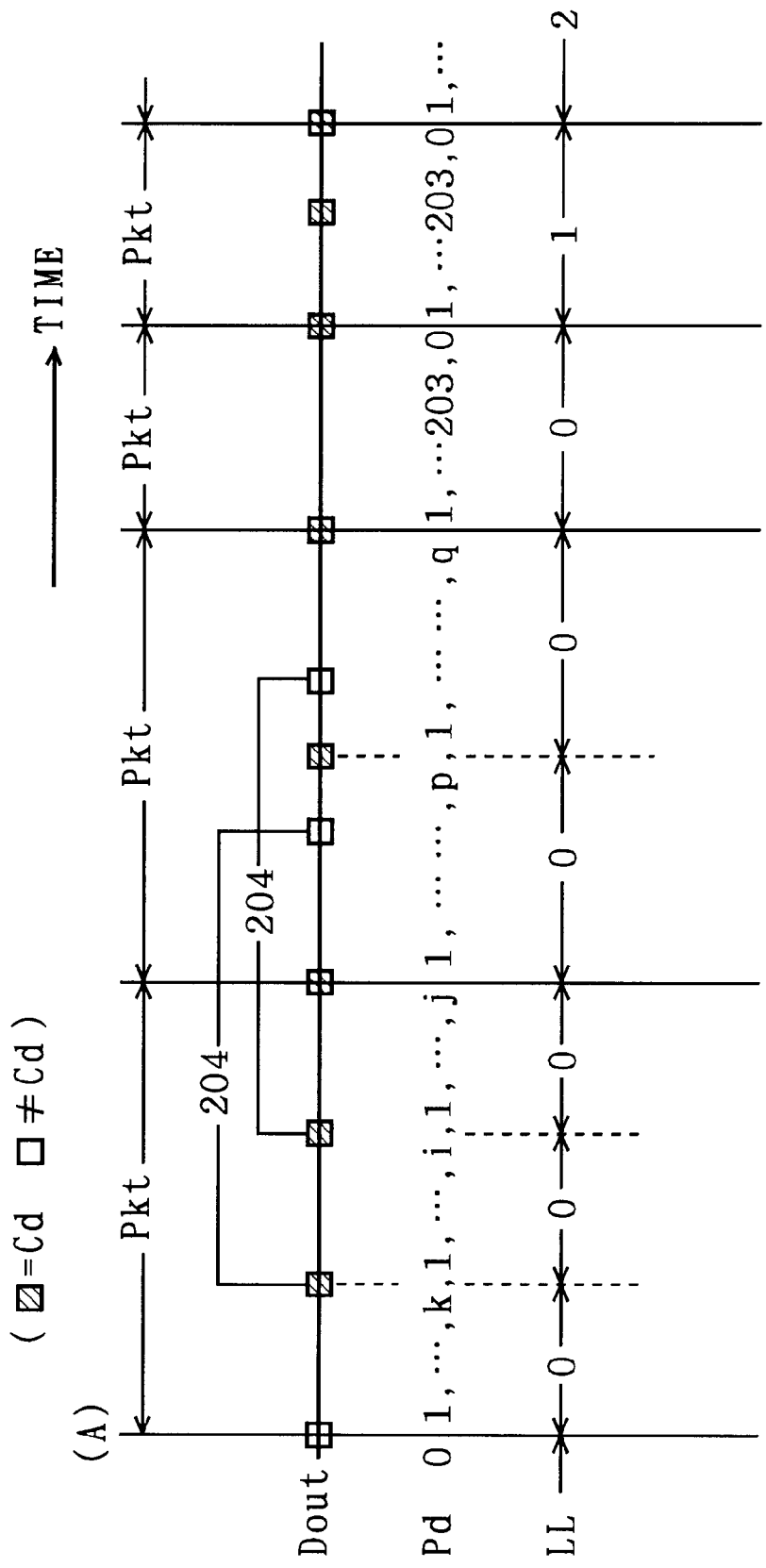

FIG. 21 and FIG. 22 are diagrams for explaining an example of the operation of the synchronization detecting portion 31. In these diagrams, a period corresponding to one packet Pkt is represented with a character "Pkt." The hatched square frames indicate extraction signals Dout having the same value as the synchronizing code Cd, and the blanked square frames indicate extraction signals Dout having values not coinciding with the synchronizing code Cd. In the extraction signals Dout, the synchronizing code Cd appears in the position of the head word at each break of packets Pkt unless the order of extraction is wrong and an error occurs in the data signal in the course of communication.

At the point at which the synchronization detecting portion 31 starts operating, the reset signal RST is active and therefore the processing number Pd and the lock level LL are both set at the initial value "0." After the reset is released (i.e., after the reset signal RST is set to normal), input of the extraction signal Dout is started. In the synchronization detecting portion 31, when the synchronizing code Cd appears first, the processing number Pd is set to "1" in step S55 and the lock level LL is set to "1" in step S54.

Subsequently, for each clock cycle, the processing passes through steps S56, S58, S61, and the processing number Pd increases one by one. Even if a value equal to the synchronizing code Cd appears in a position other than the head word of the packet Pkt, the processing passes through steps S48, S50, S52 and hence the lock level LL is not updated, as long as the lock level LL is not "0" that is, as long as it is "1" or larger, and the processing number Pd is sequentially incremented up to "203."

When the processing number Pd reaches "203," steps S56, S57, or steps S48, S50, S52 are performed to return the processing number Pd to "0." When the synchronizing code Cd normally appears as the head word of the packet Pkt in the next clock cycle as shown in FIG. 21, steps S47, S53, S54, S55 are conducted to increment the processing number Pd to "1" and the lock level to "2."

After that, similarly, the lock level LL is sequentially increased to "3," "4," . . . every time the synchronizing code Cd normally appears as a head word of a packet Pkt. When the lock level LL attains the upper limit value "7," only the processing number Pd is incremented to "1" through steps S47, S53, S55 even when the synchronizing code Cd appears in a head word of a packet Pkt. The lock level LL is not updated any longer, but is held at the upper limit value "7." That is to say, the lock level LL never exceeds the predetermined upper limit value in any cases.

As shown in FIG. 21, if the synchronizing code Cd does not appear in the head word of the packet Pkt when the lock level LL is "3," for example, the processing in the synchronization detecting portion 31 passes through steps S56, S58, S59, S60 and S61. As the result, the processing number Pd is incremented to "1" and the lock level LL is decremented by "1." That is to say, the lock level LL is decreased from "3" to "2."

When the synchronizing code Cd appears in the head word in the next packet Pkt, the lock level LL is increased by "1" again, but if the synchronizing code Cd does not appear as shown in FIG. 21, the lock level LL is further decremented to "1." If the synchronizing code Cd does not appear in the head word in the next packet Pkt again, the lock level LL is decremented back to the initial value "0."

When the lock level LL is "0," the processing number Pd is repeatedly increased from "0" to "203" through the flow of steps S56, S58, S61 or steps S56, S57 and the lock level LL continuously maintains the value "0", unless an extraction signal Dout coinciding with the synchronizing code Cd appears.

FIG. 22 shows operation following after that shown in FIG. 21, where the character (A) shown in both drawings indicates the same point of time. When the lock level LL is "0," the first synchronizing code Cd is temporarily treated as the head word of the packet Pkt. As shown in FIG. 22, if the synchronizing code Cd appears when the processing number Pd has a value "k," the processing number Pd is set to "1" in steps S48 and S49, but the lock level LL is maintained at "0" without change. Setting the processing number Pd to "1" means the fact that the input synchronizing code Cd is temporarily regarded as the head word of the packet Pkt, that is, it means the fact that the position of the break of packets Pkt is temporarily determined.

If data equal to the synchronizing code Cd appears before the next head word of the temporary packet Pkt appears, i. e. before the processing number Pd is initialized to "0" via "203" (when the processing umber Pd has the value "i" in FIG. 22), the processing number Pd is set to "1" in steps S48, S49 again, since the lock level LL remains at "0." That is to say, the temporary position of the head word of the packet Pkt is corrected to the position of the new synchronizing code Cd.

Subsequently, in the same way, every time the synchronizing code Cd appears before the processing number Pd returns to "0" via "203" (when the processing number Pd has values "j," "p," "q" in FIG. 22), the processing number Pd is set to "1" and the temporary position of the head word of the packet Pkt is corrected. In this period, the lock level LL is continuously maintained at "0."

If the synchronizing code Cd does not appear before the processing number Pd is returned to the initial value "0" via "203" and then the processing number Pd attains "0," that is to say, if the synchronizing code Cd appears in the position of the next head word of the temporary packet Pkt, the processing number Pd is incremented to "1" and the lock level LL is incremented to "1" in steps S47, S53, S54, S55.

Even if the synchronizing code Cd appears in a position other than the head word of the packet pkt, the processing number Pd is not set to "1" if the lock level LL is "1" or larger, as has been mentioned before. That is to say, when the lock level LL increases from "0" to "1," the temporary position of the break of packet Pkt is treated as a definite one. As long as the lock level LL does not return to "0," the position of the break of packets Pkt is not changed. The operating state of the device 101 at this time is referred to as "a synchronous state." In contrast, if the lock level LL is "0," the break of packets Pkt is treated as a temporary one and a new break is always searched for. This operating state of the device 101 is referred to as "an asynchronous state."

When the lock level LL is "1" or larger, the lock level LL increases one by one up to the upper limit value, away from "0" which corresponds to the asynchronous state, every time the synchronizing code Cd appears in a head word of a packet Pkt, reflecting the good possibility of the correctness of the break of packets Pkt. On the other hand, every time a value other than the synchronizing code Cd appears in a head word of a packet Pkt, the lock level LL decreases one by one toward "0" corresponding to the asynchronous state, reflecting the poor possibility of the correctness of the break of packets Pkt. When the lock level LL reaches "0," the operating state is drawn back to the asynchronous state. Thus the lock level LL can be regarded as a variable representing the possibility of correctness of the break of packets Pkt.

Although the asynchronous state and the synchronous state are distinguished depending on whether the lock level LL has a value "0" or a value of "1" or larger in this preferred embodiment, the reference value of the lock level LL for separating the two states can be set at an arbitrary value from "0" to the upper limit value. For example, the reference value can be set at "2" so that it is regarded as the asynchronous state when the lock level LL is "2" or lower and as the synchronous state if it has a value over "2." In this case, the reference value for comparison in steps S13 (FIG. 10), S42, S48, S59 (FIG. 20) is changed from "0" to "2."

In this case, a temporary break of packets Pkt is not defined until the synchronizing code Cd appears three times only in a head word of a temporarily determined packet Pkt, and only thereafter the state is shifted from the asynchronous state to the synchronous state. Thus, a higher reference value for distinguishing the asynchronous state and the synchronous state allows the shift from the asynchronous state to the synchronous state to be made at a higher possibility of correctness of a break of packets Pkt. That is to say, the determination as to the correctness of a break of packets Pkt is made more carefully as the reference value becomes higher.

The object of the synchronizing device resides in correctly extracting 8-bit-long unit data, for example, assigned to the input data signal Data_In, identifying the break of packets Pkt, and reconfiguring the data signal of the format of packets Pkt. Since the device 101 introduces a variable, or the lock level LL, the possibility of correctness of the break of packets Pkt is quantified, and the correctness is constantly tested so that the possibility can be increased or decreased depending on the results. Then the operating state is separated, depending on the level of the possibility, into the "asynchronous state" in which the break of packets Pkt is treated as a temporary one and the "synchronous state" in which it is treated as a definite one. This enables synchronization with less errors to be effectively established with reduced waste time.

<2-6. Head Signal Generating Portion and Others>

Figure 23:
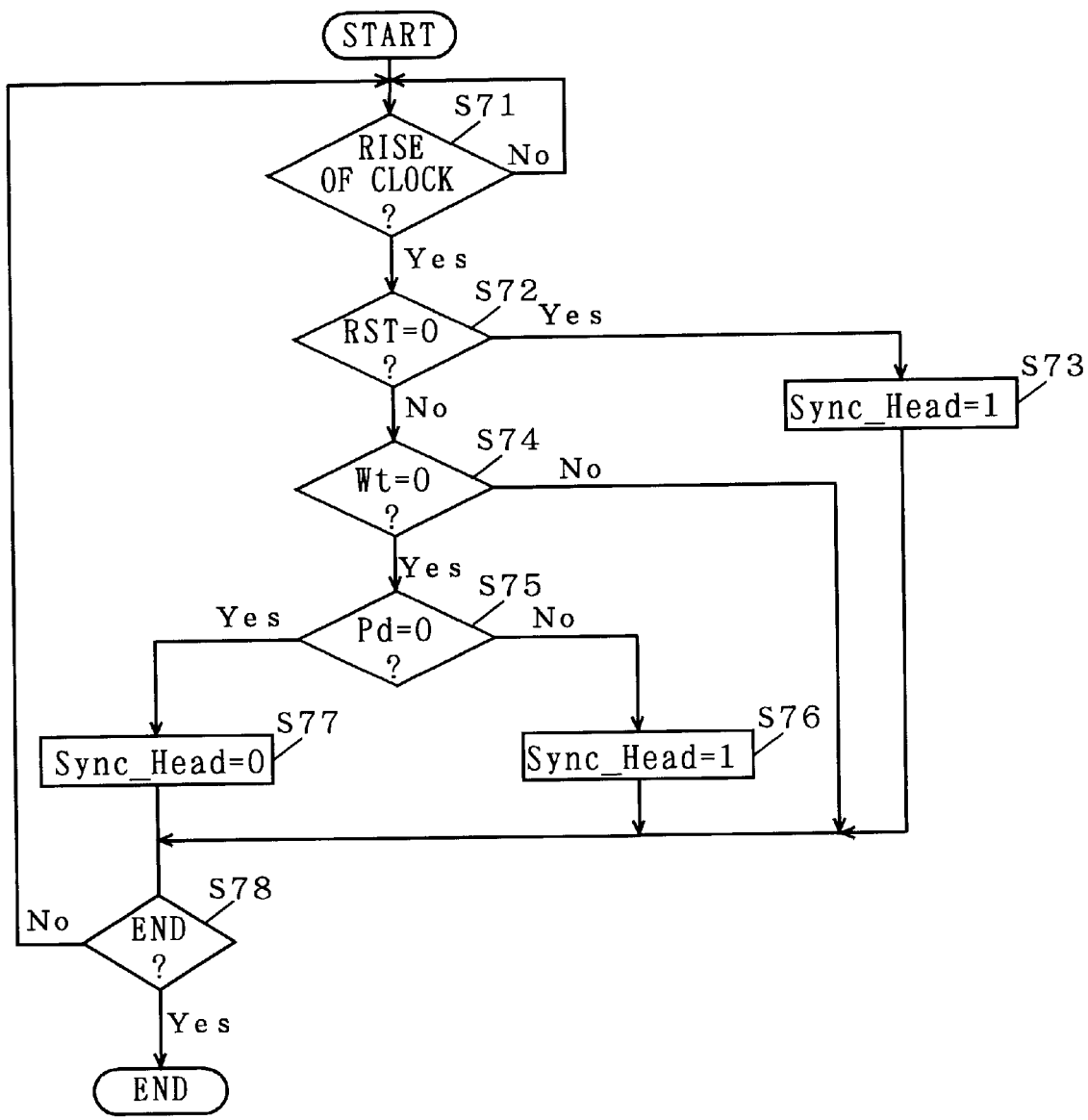
FIG. 23 is a flow chart showing the operation of the head signal generating portion in FIG. 18.

FIG. 23 is a flow chart showing the flow of operation of the head signal generating portion 32. In this operating flow, too, the processing loop in steps S71~S78 is repeatedly executed until a determination is made to terminate the processing in step S78. Since the flow has step S71, the processing in and after step S72 is started in synchronization with a leading edge of the clock signal Clk.

In step S72, it is determined whether the reset signal RST is active ("0"). If the reset signal RST is active, the reset processing in step S73 is executed and the head signal Sync_Head is set to the normal initial value "1." After that, the processing moves to step S78. If the reset signal RST is normal ("1"), the normal processing in and after step S74 is executed.

In step S74, it is determined whether the wait state indication signal Wt is normal ("0"). If the wait state indication signal Wt is not normal, that is, if the current clock cycle is in the "wait state," the processing directly moves to step S78. That is to say, no processing is done in the "wait state."

If the wait state indication signal Wt is normal, it is determined in step S75 whether the value of the processing number Pd is "0." If the processing number Pd is not "0," step S76 sets the head signal Sync_Head to normal ("1"). If the processing number Pd coincides with "0," step S77 sets the head signal Sync_Head to active ("0"). When step S76 or S77 is finished, the processing moves to step S78.

Figure 24:
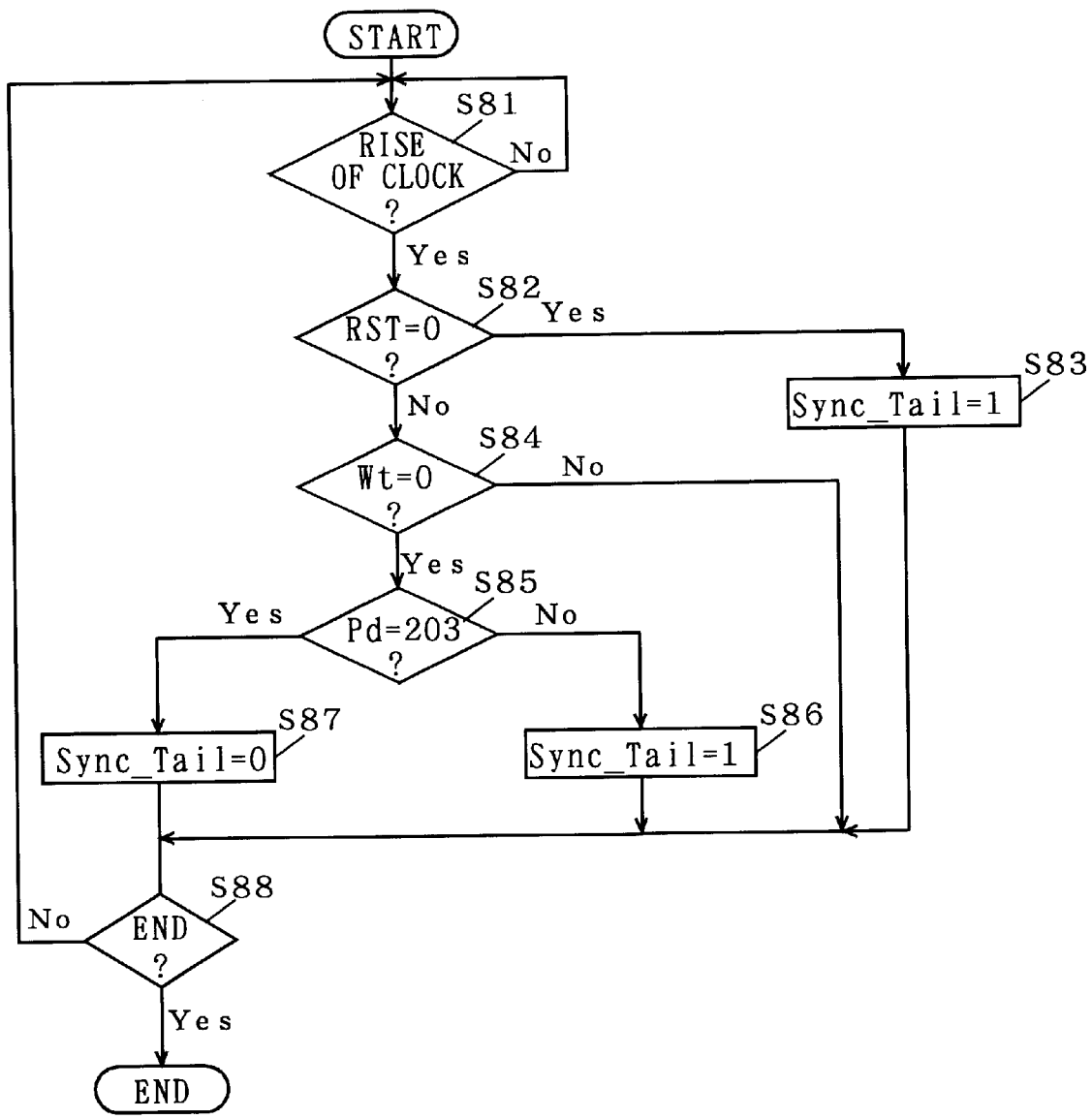
FIG. 24 is a flow chart showing the operation of the tail signal generating portion in FIG. 18.

FIG. 24 is a flow chart showing the flow of operation of the tail signal generating portion 33. The tail signal generating portion 33 operates according to a flow similar to that for the head signal generating portion 32 shown in FIG. 23. More specifically, the processing loop in steps S81–S88 is repeatedly executed until a determination is made to end the processing in step S88. The processing in and after step S82 is started in synchronization with a leading edge of the clock signal Clk.

In step S82, it is determined whether the reset signal RST is active ("0"). If the reset signal RST is active, the tail signal Sync_Tail is set to the normal initial value "1" in step S83. After that, the processing moves to step S88. If the reset signal RST is normal ("1"), the normal processing in and after step S84 is executed.

In step S84, it is determined whether the wait state indication signal Wt is normal ("0"). If the wait state indication signal Wt is not normal, that is, if the current clock cycle is in the "wait state," the processing directly moves to step S88. That is to say, no processing is done in the "wait state."

If the wait state indication signal Wt is normal, it is determined in step S85 whether the value of the processing number Pd is "203." If the processing number Pd is not "203," step S86 sets the tail signal Sync_Tail to normal ("1"). If the processing number Pd coincides with "203," step S87 sets the tail signal Sync_Tail to active ("0"). When step S86 or S87 is finished, the processing moves to step S88.

Figure 25:
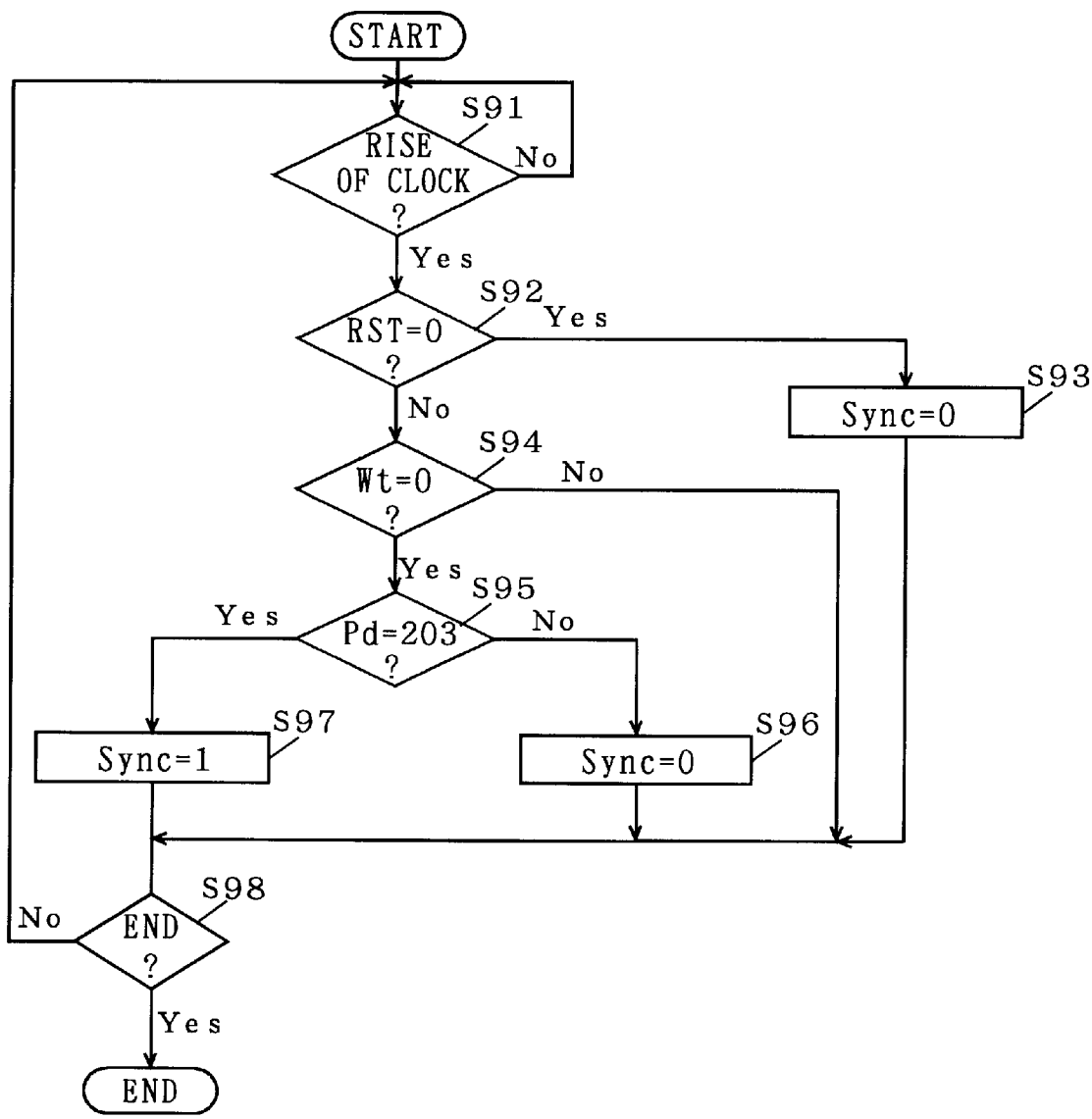
FIG. 25 is a flow chart showing the operation of the synchronizing signal generating portion in FIG. 18.

FIG. 25 is a flow chart showing the flow of operation of the synchronizing signal generating portion 34. The synchronizing signal generating portion 34, too, operates according to a flow similar to that for the head signal generating portion 32 shown in FIG. 23. More specifically, the processing loop in steps S91–S98 is repeatedly executed until a determination is made to end the processing in step S98. The processing in and after step S92 is started in synchronization with a leading edge of the clock signal Clk.

In step S92, it is determined whether the reset signal RST is active ("0"). If the reset signal RST is active, the synchronizing signal Sync is set to the normal initial value "0" in step S93. After that, the processing moves to step S98. If the reset signal RST is normal ("1"), the normal processing in and after step S94 is executed.

In step S94, it is determined whether the wait state indication signal Wt is normal ("0"). If the wait state indication signal Wt is not normal, that is, if the current clock cycle is in the "wait state," the processing directly moves to step S98. That is to say, no processing is done in the "wait state."

If the wait state indication signal Wt is normal, it is determined in step S95 whether the value of the processing number Pd is "203." If the processing number Pd is not "203," step S96 sets the synchronizing signal Sync to normal ("0"). If the processing number Pd coincides with "203," step S97 sets the synchronizing signal Sync to active ("1"). When step S96 or S97 is finished, the processing moves to step S98.

<2-7. Data Output Portion and Clock Modifying Portion>

Figure 26:
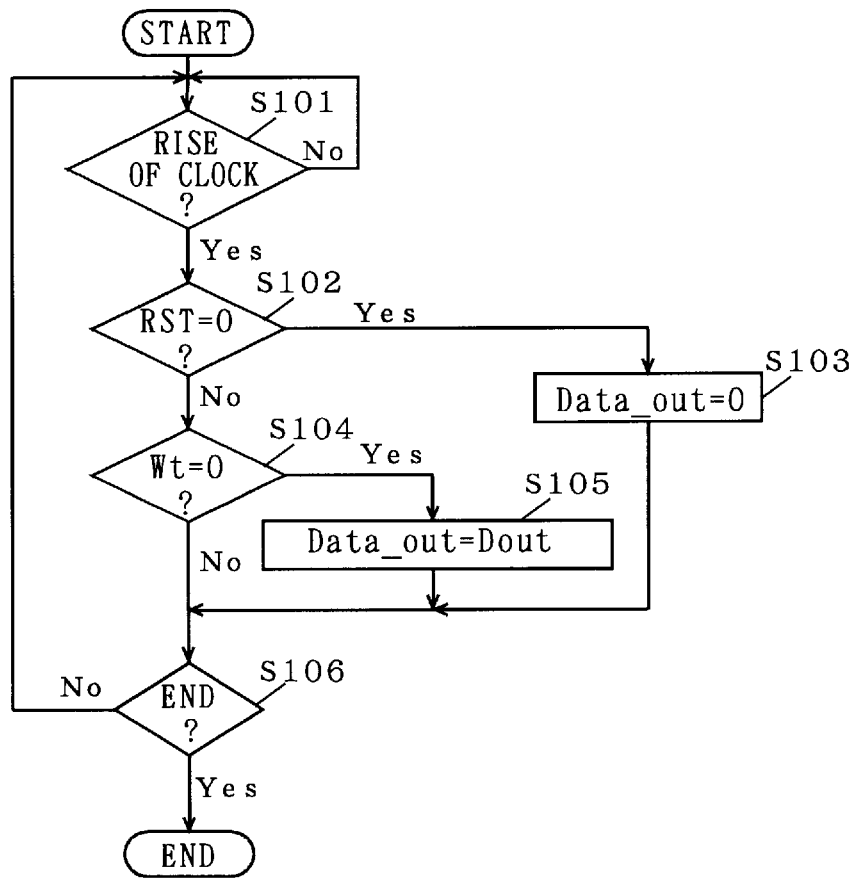
FIG. 26 is a flow chart showing the operation of the data output portion in FIG. 18.

FIG. 26 is a flow chart showing the flow of operation of the data output portion 35. The data output portion 35, similarly to the head signal generating portion 32 shown in FIG. 23, repeatedly executes the processing loop in steps S101–S116 until a determination to end the processing is made in step S106. The processing in and after step S102 is started in synchronization with a leading edge of the clock signal Clk.

In step S102, it is determined whether the reset signal RST is active ("0"). If the reset signal RST is active, the output data signal Data_Out is set to the initial value "0" in step S103. Subsequently, the processing moves to step S106. If the reset signal RST is normal ("1"), the normal processing in and after step S104 is executed.

In step S104, it is determined whether the wait state indication signal Wt is normal ("0"). If the wait state indication signal Wt is not normal, that is to say, if the current clock cycle is in the "wait state," the processing directly moves to step S106. That is to say, in the "wait state," no processing is done. If the wait state indication signal Wt is normal, the extraction signal Dout is provided to the output data signal Data_Out in step S105. When step S105 is ended, the processing moves to step S106.

When the clock cycle is in the "wait state," the processing in step S105 is not conducted and therefore the value of the preceding output data signal Data_Out, or the value provided one clock cycle before, is intactly held as the output data signal Data_Out. Accordingly, the output data signal Data_Out is not affected in the "wait state" clock cycle, whatever value the extraction signal Dout has.

Accordingly, the pattern selecting portion 23 (FIG. 4) does not necessarily have to hold the preceding extraction signal Dout in the "wait state." In other words, step S25 in FIG. 10 is not essential, and any value can be outputted as the extraction signal Dout in the "wait state." If step S25 is provided, the comparing processing in step S104 may be removed from the flow chart in FIG. 26, with the data output portion 35 so constructed that the processing in step S105 is always executed independently of the value of the wait state indication signal Wt when the reset signal RST is released.

Figure 27:
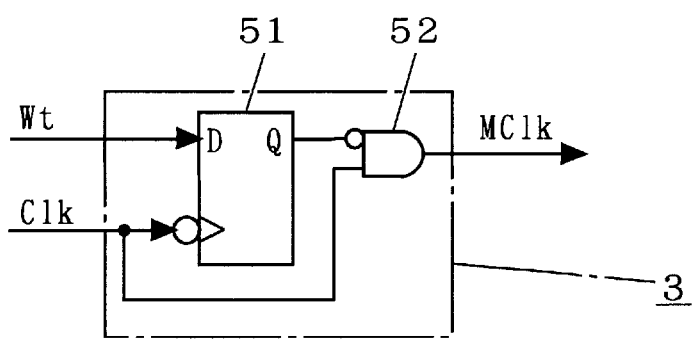
FIG. 27 is a block diagram showing the clock modifying portion in FIG. 4.

FIG. 27 is a circuit diagram showing the structure of the clock modifying portion 3. The clock modifying portion 3 has a flip-flop 51 and a logic element 52. The flip-flop 51 receives the wait state indication signal Wt at the data input terminal and the clock signal Clk at the clock input terminal. The logic element 52 receives the output data from the flip-flop 51 at the inverted input terminal and the clock signal Clk at the non-inverted input terminal. The output data of the logic element 52 is externally outputted as the modified clock signal MClk.

The flip-flop 51 holds the wait state indication signal Wt in the output signal in synchronization with a fall of the clock signal Clk. The logic element 52 is an AND circuit having a non-inverted input terminal and an inverted input terminal, which functions as a logic switch which outputs the clock signal Clk as the modified clock signal MClk only when the output signal of the flip-flop 51 has a value "0."

<2-8. Output Signals of Device 101>

Figure 28:
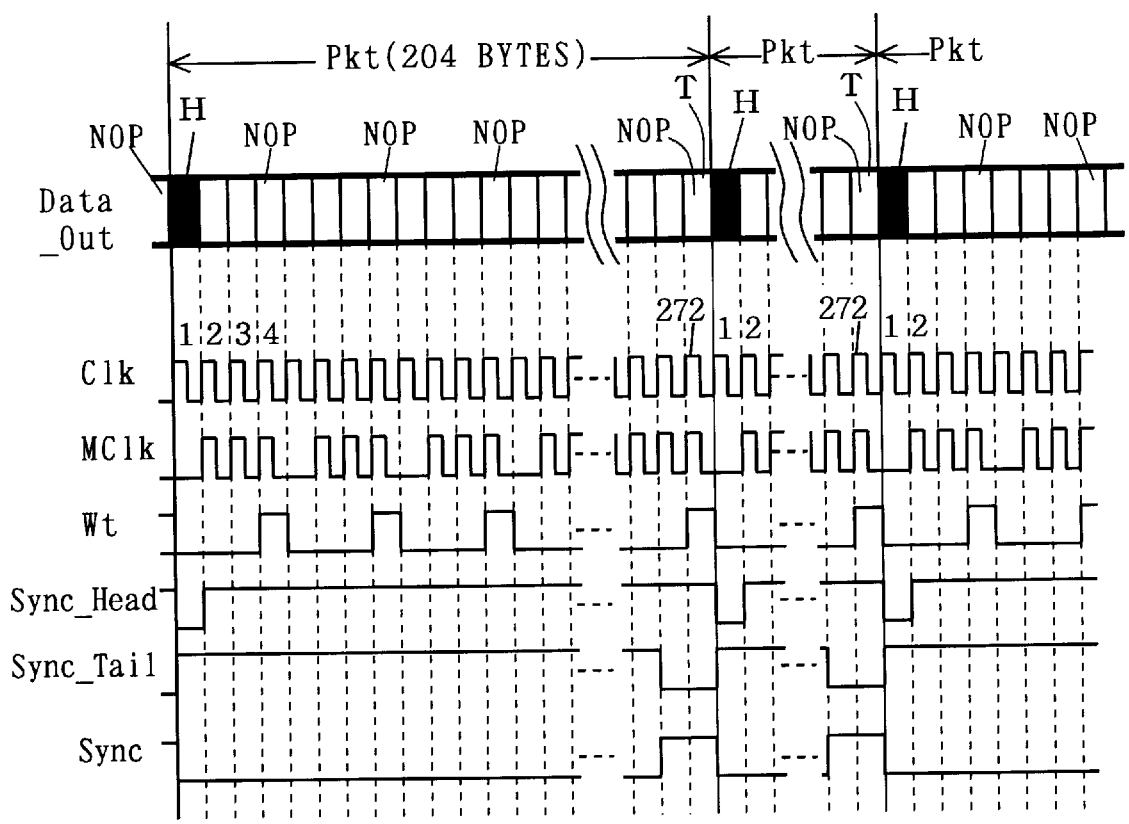
FIG. 28 is an explanation drawing showing the operation of the clock modifying portion in FIG. 27 and others.

FIG. 28 is a timing chart showing the various output signals provided from the device 101. One packet Pkt, a unit forming the output data signal Data_Out, includes a 204-byte signal, or 204 pieces of 8-bit-long unit data. The unit data is outputted in synchronization with a pulse of the clock signal Clk. One cycle (one clock cycle) of "wait state" appears in every four cycles (four clock cycles) of the clock signal Clk. Accordingly, one packet Pkt is outputted in 272 clock cycles.

In FIG. 28, "NOP" periodically appearing in the output data signal Data_Out is unit data in the "wait state," which has the same value as the preceding unit data. The modified clock signal MClk is obtained as a clock signal lacking in pulse of the clock signal Clk only in the "wait state." In other words, the modified clock signal MClk is outputted as pulses synchronized only with the unit data other than "NOP," i. e. only with meaningful unit data.

The decoder 122 (FIG. 1) following after the device 101 uses the modified clock signal MClk as a clock signal to smoothly process only the meaningful unit data. For this purpose, it is preferred that the trailing edge delayed by a half cycle from the rise of the clock signal Clk is utilized as the modified clock signal MClk. Hence, the modified clock signal MClk suspends with a delay of a half cycle from the appearance of "NOP."

The wait state indication signal Wt which becomes active when the clock cycle is in the "wait state" is not only used inside of the device 101 but also outputted to the outside to inform the decoder 122 and the like of the "wait state." The head signal Sync_Head is activated when the head word H of the packet Pkt appears. Accordingly, the head signal Sync_Head functions to externally signal the appearance of the head word H of the packet Pkt.

The tail signal Sync_Tail becomes active when the tail word T of the packet Pkt appears. In the example shown in FIG. 28, the tail signal Sync_Tail remains active over two clock cycles since the "NOP" appears immediately after the tail word T. As can be seen from the various flow charts described so far, none of the output signals changes in the "wait state." The tail signal Sync_Tail functions to externally signal the appearance of the tail word T of the packet Pkt. The synchronizing signal Sync is a signal referred to in the device 101, which is merely an inverted version of the logic value of the tail signal Sync_Tail.

Even if the operating state of the device is in the asynchronous state and the break of packets Pkt is just temporary, the output signals are outputted at the timing shown in FIG. 2 as well.

As is clear from the description above, the device 101 does not require the FIFO 153 of the conventional device 150. As has already been stated, the FIFO 153 requires a storage capacity for storing data of one packet Pkt, i. e. a storage capacity of 8×204 bits. The device 101 which eliminates the necessity for the FIFO 153 having this large storage capacity allows size reduction and cost reduction of the synchronizing device.

<3. Second Preferred Embodiment>

FIG. 29 is a block diagram showing the structure of the synchronization detecting portion 31 of a synchronizing device of a second preferred embodiment. The synchronization detecting portion 31 of this preferred embodiment is characteristically different from that in the first preferred embodiment in that the synchronization detecting portion 31 includes a lock level changing portion 60. The lock level changing portion 60 directs the lock level generating portion 42 to change the lock level LL on the basis of the result of comparison in the comparator portion 41.

Figure 30:
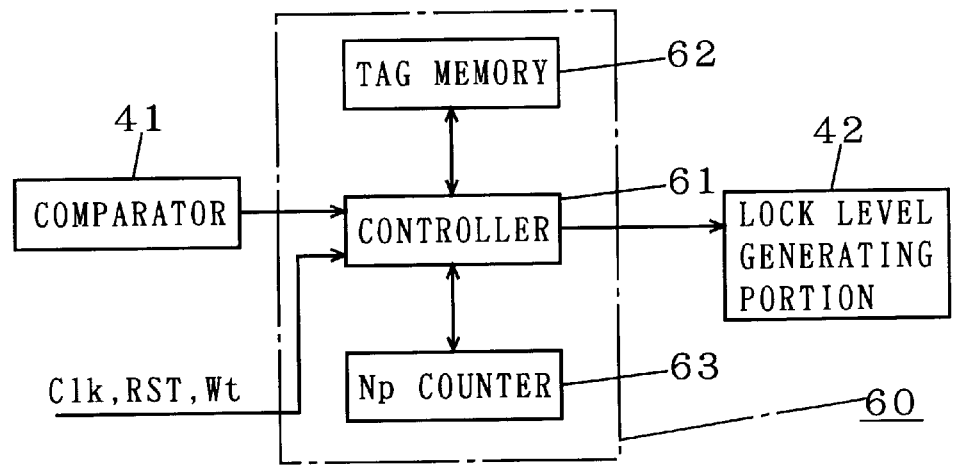
FIG. 30 is a block diagram showing the lock level changing portion in FIG. 29.

FIG. 30 is a block diagram showing the internal structure of the lock level changing portion 60. The lock level changing portion 60 includes a controller 61, a tag memory 62, and an Np counter (another processing number generating portion) 63. The Np counter 63 counts the processing number Np as a second processing number other than the processing number Pd. The processing number Np takes values in the range from "0" to "203."

The tag memory 62 has a rewritable semiconductor memory for storing tags described later. The controller 61 refers to the result of comparison in the comparator portion 41 while exchanging data with the tag memory 62 and the Np counter 63 to output a signal for instructing the lock level generating portion 42 to change the lock level LL.

Figure 31:
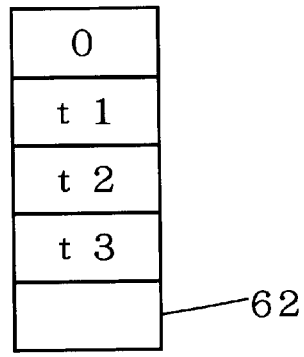
FIG. 31 is a schematic diagram showing a storage space of the tag memory in FIG. 30.

FIG. 31 is a schematic diagram showing one example of the memory space of the tag memory 62. In this example, the tag memory 62 is provided with a memory space capable of storing values of N ($\geq 1$) processing numbers Np. Since the processing number Np is represented with one byte, the tag memory 62 of the example has a storage capacity of 8xN bits. In the example of FIG. 31, five memory spaces are prepared and four numerical values "0," "t1," "t2," "t3" are stored as tags.

Figure 32:
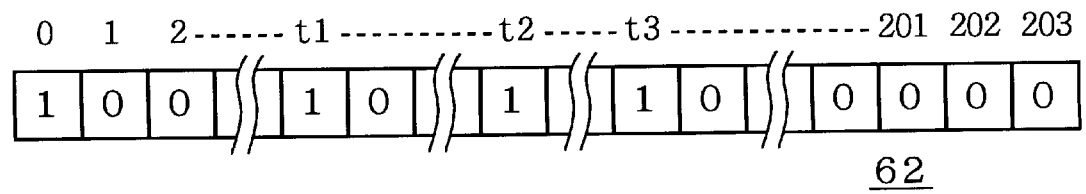
FIG. 32 is a schematic diagram showing a storage space of the tag memory in FIG. 30

FIG. 32 is a schematic diagram showing another example of the memory space of the tag memory 62. The tag memory 62 of this example is constructed so that 1-bit-long data can be stored in each of 204 addresses "0"–"203." Accordingly, its storage capacity is 204 bits. The value of each data is usually normal ("0" in this example) and the data is set to active ("1") only at an address corresponding to a processing number Np to be stored as a tag. The tag is substantially stored in this way. That is to say, the tag memory 62 of this example is configured as a flag register.

When the packet Pkt is formed of a larger number of unit data, the example shown in FIG. 31 is more advantageous than that shown in FIG. 32, since it requires a smaller memory capacity. When the packet is formed of a smaller number of unit data, the example shown in FIG. 32 is more advantageous than that shown in FIG. 31.

<3-1. Operation of Lock Level Changing Portion>

Figure 33:
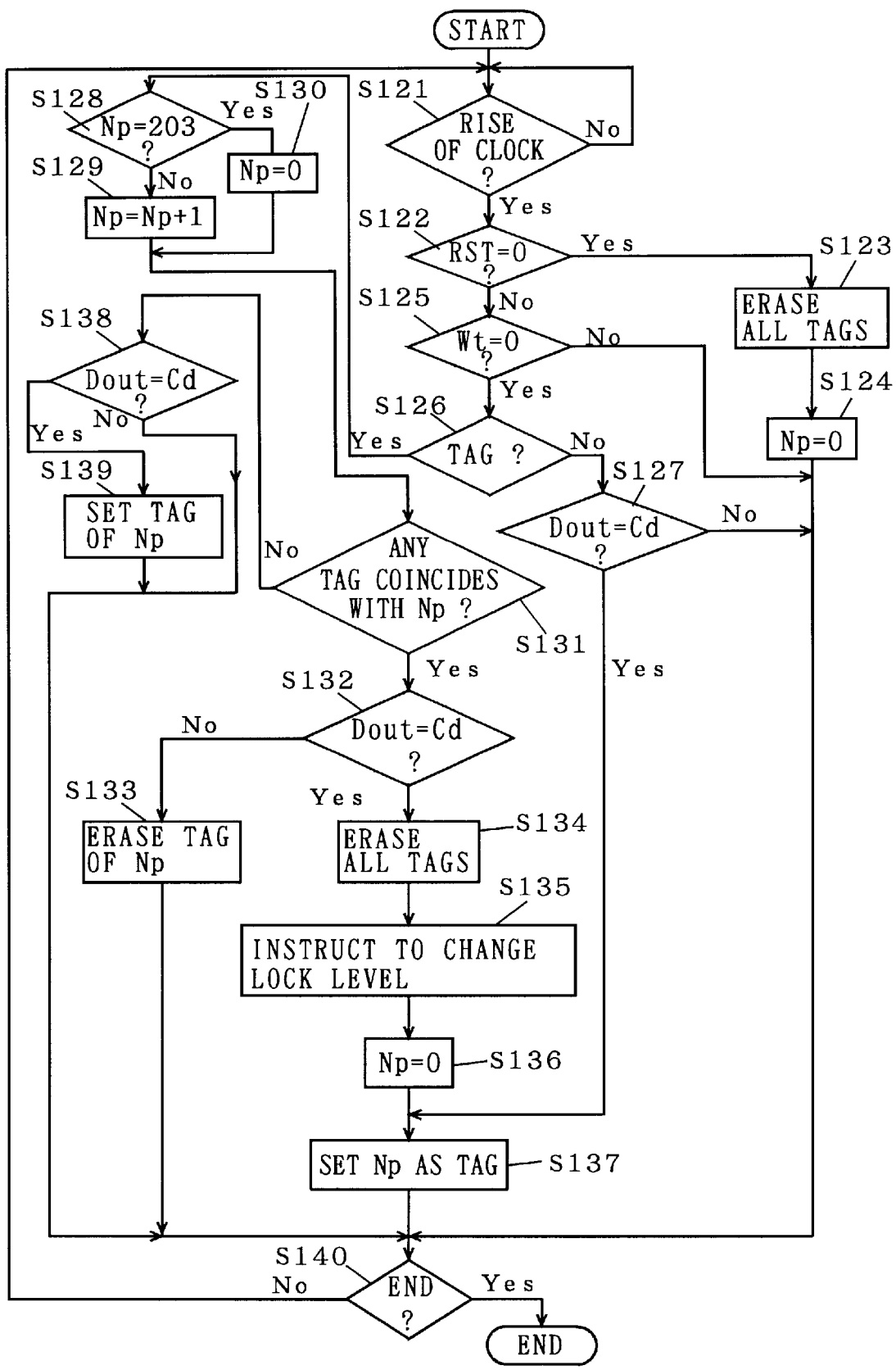
FIG. 33 is a flow chart showing the operation of the lock level changing portion in FIG. 30.

FIG. 33 is a flow chart showing the flow of operation of the lock level changing portion 60. Similarly to the head signal generating portion 32 shown in FIG. 23, the lock level changing portion 60 repeatedly executes the processing loop in steps S121–S140 until a determination to end the processing is made in step S140. The processing in and after step S122 is started in synchronization with a leading edge of the clock signal Clk.

In step S122, it is determined whether the reset signal RST is active ("0"). If the reset signal RST is active, all tags are erased from the tag memory 62 in step S123. That is to say, the storage data in the tag memory 62 is initialized. Further, in step S124, the processing number Np, which is the value counted in the Np counter 63, is initialized to "0." Then the processing moves to step S140.

If the reset signal RST is normal ("1"), the normal processing in and after step S125 is executed. It is determined in step S125 whether the wait state indication signal Wt is normal ("0"). If the wait state indication signal Wt is not normal, that is, if the current clock cycle is the "wait state," the processing directly moves to step S140. That is to say, in the "wait state," no processing is done. If the wait state indication signal Wt is normal, it is determined in step S126 whether a tag is stored in the tag memory 62.

If no tag is stored, it is determined in step S127 whether the extraction signal Dout coincides with the synchronizing code Cd. If they do not coincide with each other, the processing moves to step S140, and if they do, the processing moves to step S137 described later.

If the determination in step S126 shows that some tag is stored in the tag memory 62, the processing number Np is updated in steps S128–S130 first. More specifically, the processing number Np is cyclically incremented in the range from "0" to "203." Subsequently, in step S131, it is determined whether any tag coincides with the value of the current processing number Np.

In this determination, if some tag coincides with it, it is determined in step S132 whether the extraction signal Dout coincides with the synchronizing code Cd. If the extraction signal Dout does not coincide with the synchronizing code Cd, the tag coinciding with the value of the current processing number Np is erased from the tag memory 62 in step S133. Then the processing moves to step S140.

If the determination in step S132 shows coincidence between the extraction signal Dout and the synchronizing code Cd, all tags are erased in step S134. That is to say, the tag memory 62 is initialized. Then the lock level generating portion 42 is directed to change the lock level LL in step S135. Next, the value of the processing number Np is returned to the initial value "0" in step S136. Then the tag of the value "0" of the processing number Np is stored into the tag memory 62 in step S137. When the processing passes through step S127, the value of the processing number Np is "0". Accordingly, the tag of the value "0" is always stored into the tag memory 62 in step S137. Subsequently the processing moves to step S140.

If the determination in step S131 shows that no tag coincides with the processing number Np, it is determined in step S138 whether the extraction signal Dout coincides with the synchronizing code Cd. If they coincide with each other, the tag coinciding with the value of the processing number Np is stored into the tag memory 62 in step S139 and then the processing moves to step S140. If they do not coincide with each other, the processing moves directly to step S140.

In the processing described above, steps S123, S133, S134, S137, S139 related to storage and erase of tags are executed by the tag memory 62 on the basis of instructions from the controller 61. Steps S124, S128, S129, S130, S136 related to setting of the processing number Np are executed by the Np counter 63 on the basis of instructions from the controller 61.

<3-2. Operation of Lock Level Changing Portion>

Figure 34:
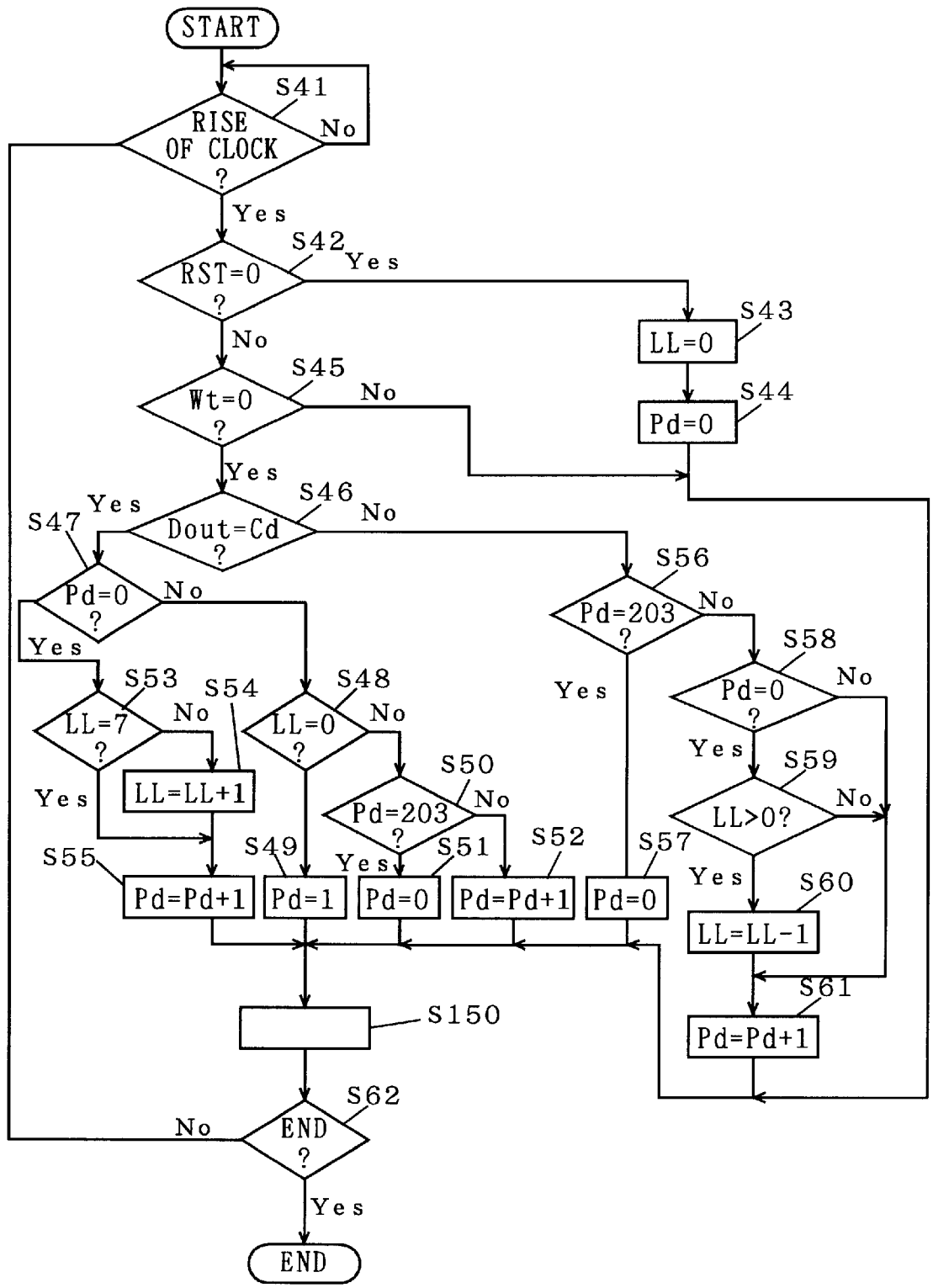
FIG. 34 is a flow chart showing the operation of the synchronization detecting portion in FIG. 29.

FIG. 34 is a flow chart showing the flow of operation of the device portion :5 other than the lock level changing portion 60 in the synchronization detecting portion 31. This flow of operation characteristically differs from that shown in FIG. 20 in that step S150 is inserted immediately before step S62. The processing in step S150 is achieved by the lock level generating portion 42.

Figure 35:
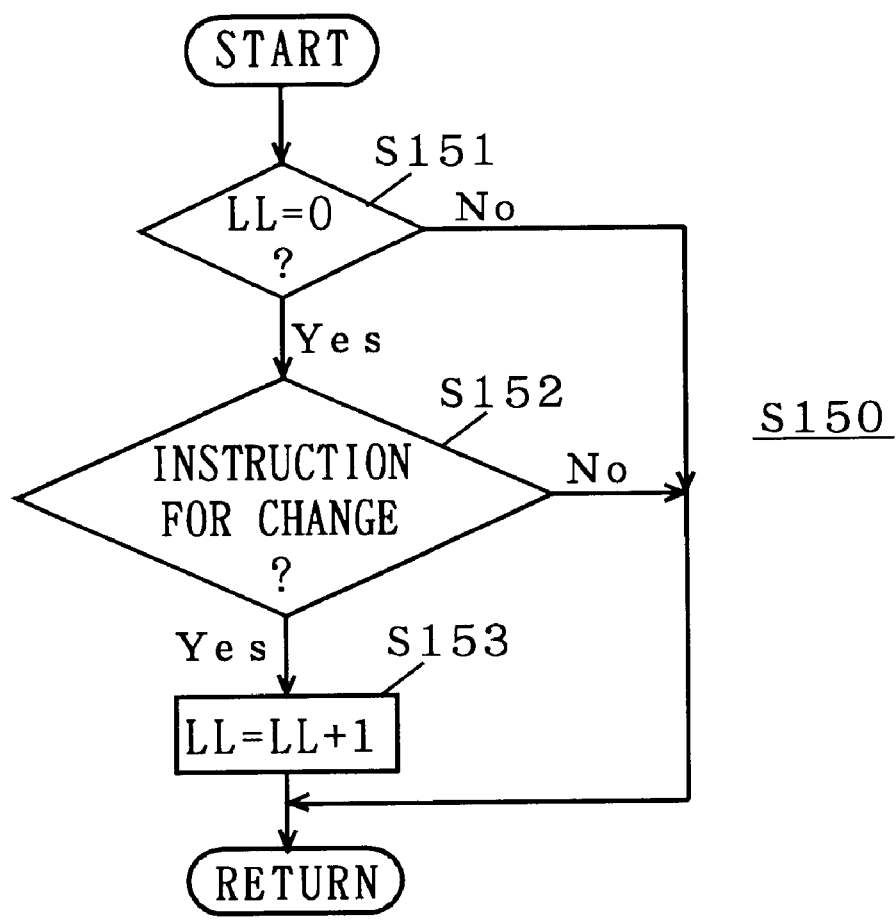
FIG. 35 is a flow chart of step S150 in FIG. 34.

FIG. 35 is a flow chart showing the internal flow of step S150. When the processing in step S150 is started, it is first determined in step S151 whether the lock level LL is "0." If the lock level LL is not "0," the processing in step S150 is terminated and the processing moves to step S62. If the lock level LL coincides with "0," it is determined in step S152 whether there is an instruction to change the lock level LL from the lock level changing portion 60.

If there is no instruction for change, the processing in step S150) is ended. If there is an instruction for change, the lock level LL is incremented by "1" in step S153. That is to say, the instruction for change executed in step S135 (FIG. 33) means an instruction for increasing the lock level LL by "1." When step S153 is ended, the entirety of step S150 is ended.

Figure 36:
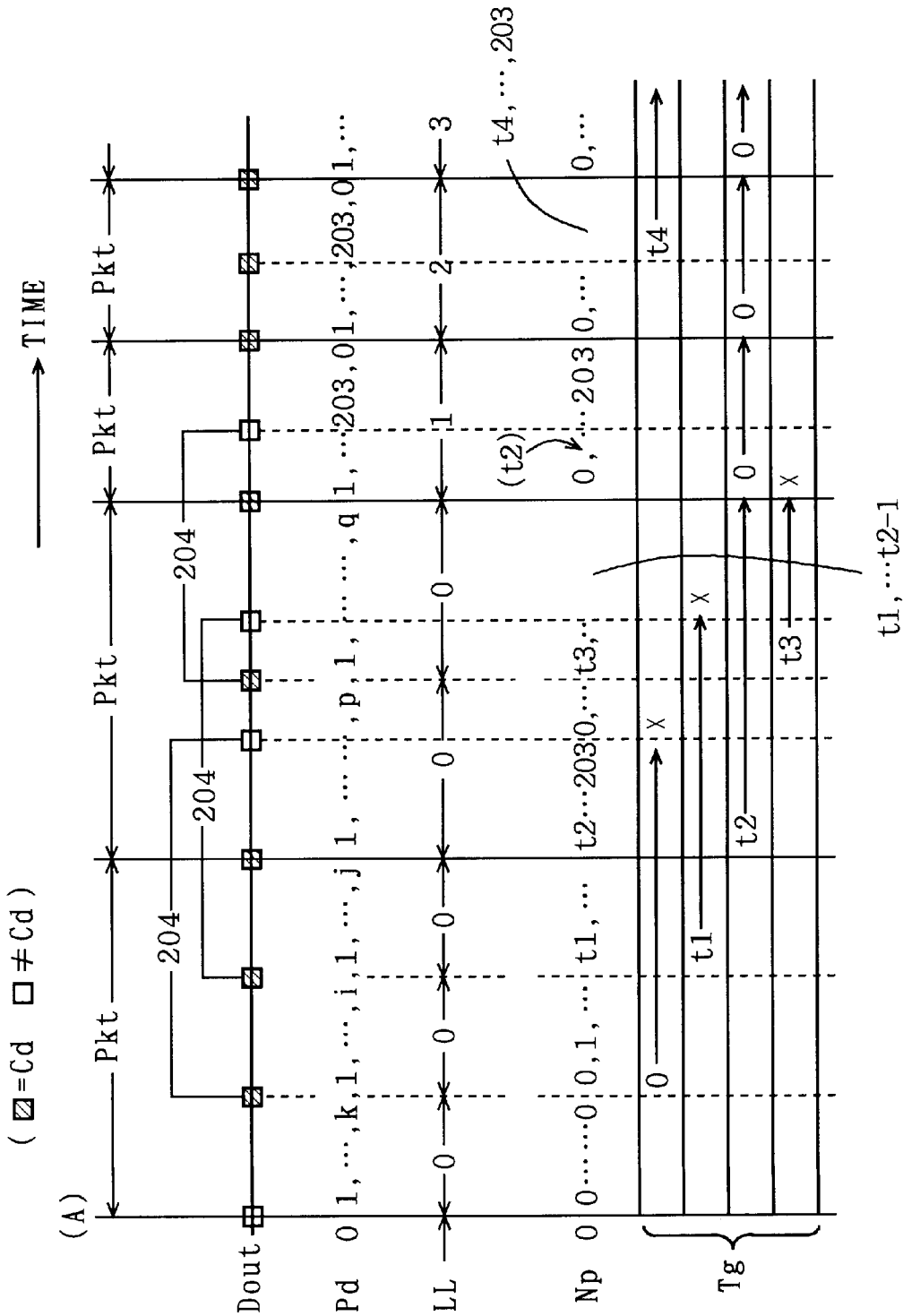
FIG. 36 is an explanation drawing showing the operation of the synchronization detecting portion in FIG. 29.

FIG. 36 is an explanation drawing showing an example of operation of the synchronization detecting portion 31. This diagram shows operation performed after the point (A) in the case where the same extraction signal Dout is inputted at the same timing as that shown in FIG. 21 and FIG. 22. Accordingly, the extraction signal Dout and the processing number Pd change at the same timing and in the same way as those shown in FIG. 22.

At time (A), the period in which the lock level LL has the value "0" and no synchronizing code Cd appears has already lasted longer than the period corresponding to one packet Pkt. Hence no tag is stored in the tag memory 62 at point (A). That is to say, the tag memory 62 is in the initial state.

In this state, when the synchronizing code Cd appears first, a tag corresponding to the processing number Np (="0") is stored into the tag memory 62 through steps S126, S127, S137. Storing a tag means the fact that it has been determined that the synchronizing code Cd appearing at the processing number Np corresponding to the tag may possibly be the head word of the packet Pkt and that the position of the candidate for the head word is stored. That is to say, the tag represents, in the form of the processing number Np, the position of a candidate for the head word, or a candidate for a break of packets Pkt. In FIG. 36, the character "Tg" represents storage data in the tag memory 62.

In the next clock cycle, the processing number Np is incremented to "1" through steps S126, S128, S129. The processing further passes through steps S131, S138, S140, with no change of the storage data in the tag memory 62. Subsequently, the processing number Np similarly continues increasing for each clock cycle until the next synchronizing code Cd appears, with the storage data in the tag memory 62 unchanged. This operation reflects the fact that no candidate for a break of packets Pkt appears in this period.

When the next synchronizing code Cd appears, the processing number Np continuously increases to the value "t1" through step S126, S128, S129. Then the tag having the value "t1" is stored into the tag memory 62 through steps S131, S138, S139. That is to say, at this point, two tags "0" and "t1" are stored in the tag memory 62. This means the fact that a new candidate has been additionally stored in accordance with the appearance of the new candidate for a break of packets Pkt. Similarly, when the next synchronizing code Cd appears, the value "t2" of the processing number Np is added into the tag memory 62.

In the clock cycle coming after the clock cycle in which the processing number Np has attained "203," the processing number Np is returned back to "0" in steps S128, S130. At this time, 204 clock cycles have passed since the synchronizing code Cd first appeared. Hence the tag (="0") corresponding to the processing number Np (="0") exists in the tag memory 62. Therefore step S132 is executed after the determination in step S131.

No synchronizing code Cd appears in this clock cycle. Accordingly, step S133 is executed to erase the tag having the value "0." The fact that the tag has been erased means that the possibility of the processing number Np corresponding to the tag as being a break of packets Pkt has been eliminated, that is, that it has lost the qualification as a candidate for a break. In FIG. 36, the arrows in the data Tg stored in the tag memory 62 represent durations of existence of the tags, and the characters "X" express that the tags have been erased.

Subsequently, when the synchronizing code Cd newly appears, the value "t3" of the processing number Np is stored into the tag memory 62. That is to say, at this point, tags stored in the tag memory 62, or the candidates for a break, include the three values, "t1," "t2," and "t3."

In the clock cycle in which the processing number Np becomes "t1," the processing number Np coincides with the value "t1" in the tags stored in the tag memory 62. Step S132 is therefore executed after the determination in step S131. In this clock cycle, no synchronizing code Cd appears, either. Accordingly, step S133 is executed to erase the tag "t1" from the tag memory 62.

In the clock cycle in which the processing number Np becomes "t2" (the cycle following after the processing number Np="t2−1"), the processing number Np coincides with "t2," one of the tags stored in the tag memory 62. Accordingly, step S132 is executed after the determination in step S131. The synchronizing code Cd has appeared in this clock cycle. Therefore step S134 is executed, and first, all tags are erased from the tag memory 62, and then, an instruction is made to change the lock level LL in step S135.

In step S136, the processing number Np is changed from "t2" to the initial value "0." This corresponds to a change of the reference of tags. Then in step S137, the newly set value "0" of the processing number Np is stored into the tag memory 62 as a tag. That is to say, at this point, a value stored in the tag memory 62 is only the value "0."

Since the instruction for changing the lock level LL is made, the value of the lock level LL is incremented from "0" to "1" in step S150 (FIG. 35). Accordingly, after that, the device 101 operates in the same way as in the synchronous state. Specifically, in this clock cycle, among the plurality of candidates stored in the tag memory 62, the candidate corresponding to the tag "t2" is treated as a definite one as a break of packets Pkt. Tags other than the tag raised from a candidate to a definite one are erased from the tag memory 62.

This way, the correctness of a tag as a candidate is tested when one packet Pkt has passed after the occurrence of the tag, and if the correctness is not confirmed, the tag is immediately erased. If the correctness is confirmed, only the confirmed tag is left and the reference of tags is changed. In other cases, the processing number Np always continues periodical increment in the range from "0" to "203."

The lock level changing portion 60 continues the same operation when the lock level LL increases over "1." For example, as shown in FIG. 36, if the synchronizing code Cd appears as expected when the processing number Np returns to "0" via "203," only the tag having the value "0" is held in the tag memory 62 through steps S126, S131, S132, S134–S137, even if there is another tag.

At this time, step S135 makes an instruction to change the lock level LL, but the lock level LL is not incremented in step S150 (FIG. 35) since the lock level LL is not "0." That is to say, the instruction for change is neglected. It is not in step S150) but in step S54 (FIG. 34) that the lock level LL is incremented from "1" to "2" in this clock cycle.

As shown in FIG. 36, if the synchronizing code Cd newly appears when the processing number Np has a value "t4" in the period in which the lock level LL is "2," the tag "t4" is stored into the tag memory 62. This way, the operation of the lock level changing portion 60 itself remains unchanged independently of whether the lock level LL has the value "0" or a value "1" or larger.

As stated above, when the synchronizing code Cd appears before the processing number Np reaches "203," the synchronizing device of the second preferred embodiment takes the position of the synchronizing code Cd as a candidate for a break of packets Pkt and tests the correctness when a period corresponding to one packet Pkt has passed. If the correctness is determined as being high, the break as a candidate is regarded as a definite one and the operating state moves from the asynchronous state to the synchronous state. As can clearly be seen by comparing FIG. 22 and FIG. 33, this provides the advantage that the timing of shifting from the asynchronous state to the synchronous state is not unnecessarily delayed.

Although the synchronizing device of the second preferred embodiment requires the tag memory 62, the tag memory 62, the one shown in FIG. 32, for example, requires a much smaller storage capacity of 204 bits than the FIFO 153 requiring 8×204 bits. In the example of FIG. 31, if N is set at 10, for example, only 8×10=80 bits are required. This way, similarly to that in the first preferred embodiment, a much smaller synchronizing device can be realized at a lower cost, than the conventional one.

<4. Third Preferred Embodiment>

Figure 37:
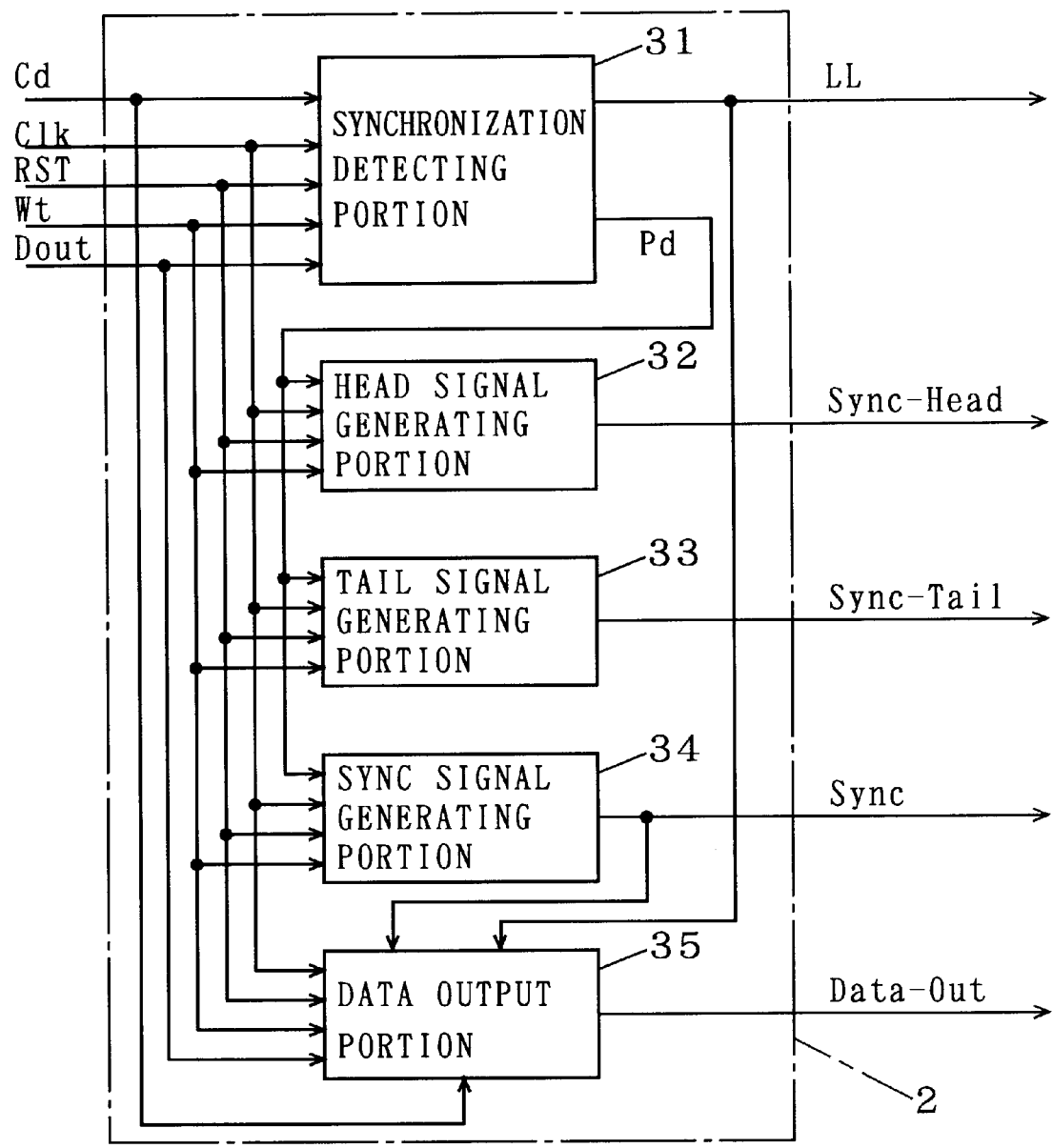
FIG. 37 is a block diagram showing a synchronization control portion according to a third preferred embodiment.

FIG. 37 is a block diagram showing the structure of the synchronization control portion 2 of a synchronizing device of a third preferred embodiment. The synchronization control portion 2 of this preferred embodiment characteristically differs from that of the first preferred embodiment in that the data output portion 35 operates referring to the synchronizing code Cd, the lock level LL, and the synchronizing signal Sync.

Figure 38:
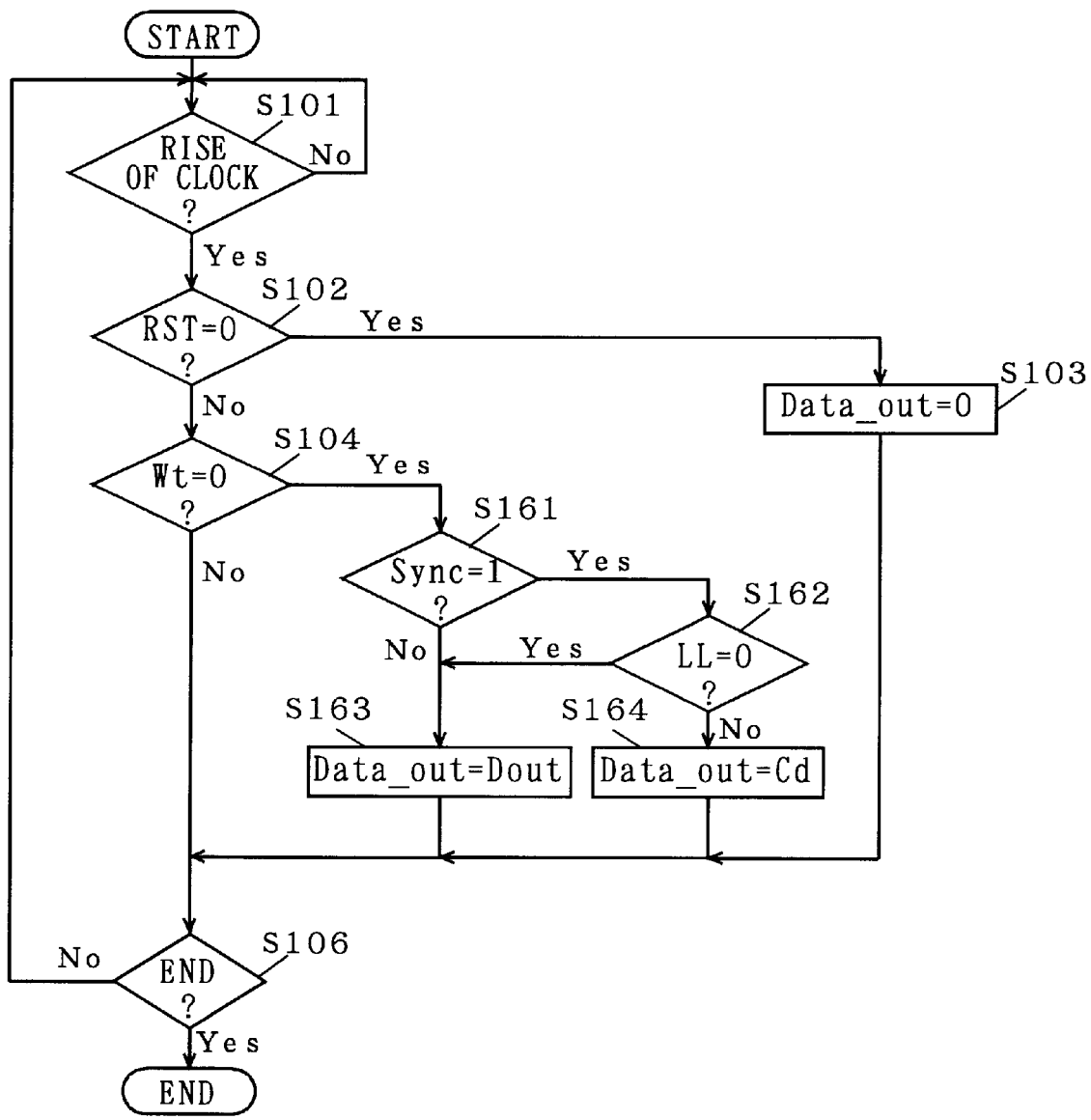
FIG. 38 is a flow chart showing the operation of the data output portion in FIG. 37.

FIG. 38 is a flow chart showing the flow of operation of the data output portion 35 in FIG. 37. This flow of operation characteristically differs from that shown in FIG. 26 in that the processing in steps S161–S164 is executed when step S104 determines that the wait state indication signal Wt is "0."

In the case where the determination in step S104 shows that the current clock cycle is not in the "wait state" (i.e., Wt=0), if the synchronizing signal Sync does not coincide with "1," i.e., if the current clock cycle does not correspond to a break of packets Pkt, or if the clock level LL has the value "0," i.e., if the operating state of the device is in the asynchronous state, then the extraction signal Dout is outputted as the output data signal Data_Out in step S163, as in step S105 (FIG. 26).

However, when the synchronizing signal Sync coincides with "1," i.e., when the current clock cycle corresponds to a break of packets Pkt, and the lock level LL does not have the value "0," i.e., the operating state of the device is in the synchronous state, the synchronizing code Cd having the originally expected value is outputted as the output data signal Data_Out in step S164, as contrasted with step S105 (FIG. 26).

Figure 39:
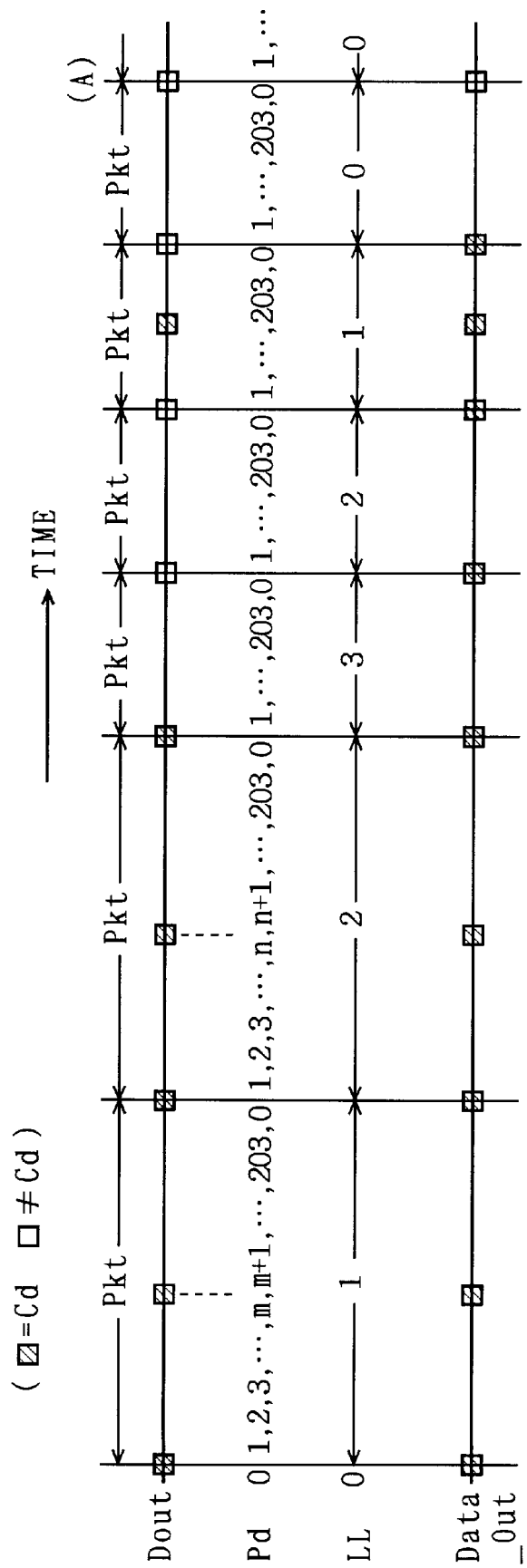
FIG. 39 is an explanation drawing showing the operation of the synchronization detecting portion in FIG. 37.

FIG. 39 is an explanation drawing showing an example of operation of the synchronization control portion 2. This diagram shows the operation in the case where the same extraction signal Dout is inputted at the same timing as those in FIG. 21. Accordingly, the extraction signal Dout, the processing number Pd and the lock level LL change at the same timing and in the same way as those in FIG. 21. However, when the lock level LL is "1" or larger, the output data signal Data_Out does not always coincide with the extraction signal Dout. That is to say, the synchronizing code Cd always appears in the head words located immediately after breaks of packets Pkt, regardless of whether the value of the extraction signal Dout coincides with the synchronizing code Cd.

If a break of packets is correct, the synchronizing code Cd should appear in the head word. In the synchronous state, the break of packets Pkt is determined with a certain or higher degree of reliability. Accordingly, if the synchronizing code Cd does not appear in the head word in the synchronous state, it is highly possible that an error is occurring in the data signal for some reason.

In the data output portion 35 of this preferred embodiment, whatever value the extraction signal Dout corresponding to a head word has, the synchronizing code Cd is provided in the output data signal Data_Out corresponding to the head word, as long as the break of packets Pkt is defined. This provides the advantage that the error is corrected and a correct value is obtained as the output data signal Data_Out.

<5. Examples of Modifications>

(1) Generally, as has already been stated, it is possible to similarly construct a device for extracting L(>m)-bit-long unit data assigned in an input data signal Data_In formed of a sequence of m($\geq$1)-bit-long unit data and outputting a data signal of the format of packets Pkt as an output data signal Data_Out. In this case, the shift register 11 has buffers each capable of storing m bits, and the number of the buffers is uniquely determined with a combination of the values of m and K.

The number, K, of patterns of the assignment of the L-bit-long unit signal in a plurality of m-bit-long unit data is determined with the combination of m and L. The pattern data extracting portion 12 generally has first to Kth pattern data extracting portions. When sequentially extracting the K kinds of patterns one by one in synchronization with the clock signal Clk and outputting it as the extraction signal Dout, the number of "wait states" to be inserted is also determined with the combination of m and L.

Figure 40:
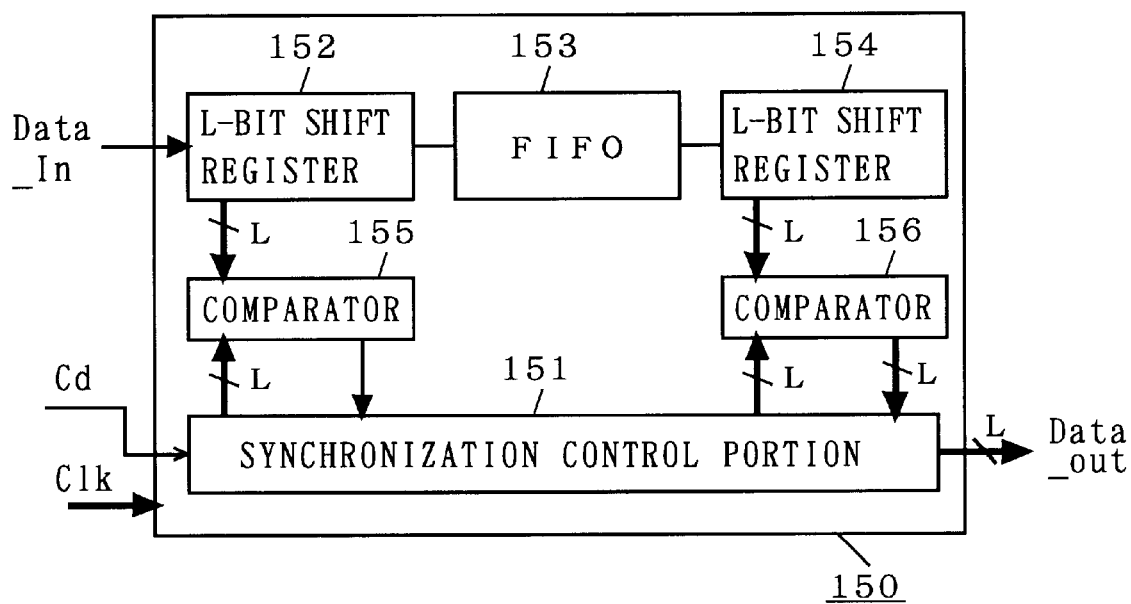
FIG. 40 is a block diagram showing a conventional synchronizing device.

(2) Particularly, when m=1 like in the conventional device 150 shown in FIG. 40, the shift register 11 can include only eight buffers each capable of storing 1 bit data. That is to say, the shift register 11 can have the same structure as the L-bit shift register 152 of the conventional device 150. Since the pattern of assignment includes only one kind, the number of the pattern data extracting portions, K, can be "1."

The 8-bit unit data extracted in the pattern data extracting portion 12 for each clock cycle is selected as the extraction signal Dout only in one clock cycle among eight clock cycles and the "wait state" is provided in the remaining seven cycles. In other words, eight kinds of modes are defined and only one of them corresponds to the mode in which the data extracted by the pattern data extracting portion 12 is selected as the extraction signal Dout, with the remaining seven modes corresponding to the "wait state."

(3) Further, it is similarly possible to construct a device in which the numbers of unit data, m, L, have the relation of m$\geq$L. In this case, it is sufficient that the shift register 11 includes two buffers each capable of storing m bits. The "wait state" is not required, and the cycle for outputting the L-bit-long unit data as the output data signal Data_Out is set equal to or shorter than the length of the cycle for inputting the m-bit-long unit data as the input data signal Data_In.

While the invention has been described in detail, the foregoing description is in all aspects illustrative and not restrictive. It is understood that numerous other modifications and variations can be devised without departing from the scope of the invention.

I claim:

1. A synchronizing device for receiving an input data signal in which a first data signal formed of unit packets each having a sequence of P($\geq$2) pieces of L($\geq$1)-bit-long first unit data is assigned in a sequence of m($\geq$1)-bit-long second unit data to form a second data signal, and for reconfiguring said first data signal from said input data signal and outputting the same, comprising:

a shift register having a plurality of buffers, said plurality of buffers each having a storage capacity of m bits and successively holding said second unit data forming said input data signal;

a pattern data extracting portion for extracting L-bit-long data from the data held in said shift register in correspondence with first to K($\geq$1)th patterns in which said first unit data is sequentially assigned in said second data signal to obtain first to Kth extraction data;

a first comparator portion for comparing each of said first to Kth extraction data with a synchronizing code as an indicator of a head word of a packet;

a pattern selecting portion for selecting and outputting one of said first to Kth extraction data as an extraction signal;

a state transition control portion for controlling the selecting operation of said pattern selecting portion depending on whether said state transition control portion in a synchronous state or an asynchronous state; and a synchronization determining portion for determining whether said state transition control portion in said synchronous state or said asynchronous state;

wherein said state transition control portion comprises,
a mode shifting portion for causing said pattern selecting portion to cyclically and sequentially select said first to Kth extraction data so that continuous L-bit-unit data are sequentially extracted from said input data signal, and
a mode changing portion for, only in the asynchronous state, every time the comparison in said first comparator portion shows that only a kth ($1 \leq k \leq K$) extraction data coincides with said synchronizing code, causing the sequential selection of the extraction data instructed by said mode shifting portion to said pattern selecting portion to be changed to a sequential selection in which the kth extraction signal corresponding to the kth pattern is set as a candidate for said head word and the extraction data are selected starting from the kth extraction data, and said synchronization determining portion comprises,
a processing number generating portion capable of cyclically counting P integers as processing numbers in synchronization with output of said extraction signal,
a second comparator portion for comparing said extraction signal with said synchronizing code, and
a state determining portion for determining whether to make a transition between said synchronous state and said asynchronous state on the basis of said processing number and a result of the comparison in said second comparator portion,
wherein, in said asynchronous state, when the comparison in said second comparator portion repeatedly provides agreement between said extraction signal corresponding to said candidate and said synchronizing code at a first certain frequency or more, said state determining portion determines to shift to said synchronous state and sets said candidate providing the agreement as a definite head word, and in said synchronous state, when the comparison in said second comparator portion repeatedly provides disagreement between said extraction signal corresponding to said definite head word and said synchronizing code at a second certain frequency or more, said state determining portion determines to shift to said asynchronous state, and said state determining portion determines whether said extraction signal corresponds to said candidate or said definite head word on a basis of said processing number.

2. The synchronizing device according to claim 1, wherein
in said asynchronous state, said processing number generating portion causes said processing number to go back to a certain value every time said extraction signal and said synchronizing code agree with each other in the comparison in said second comparator portion, and
said state determining portion determines that said extraction signal corresponds to said candidate or said definite head word when said processing number goes back to said certain value via the value preceding said certain value by one.

3. The synchronizing device according to claim 1, wherein said state determining portion further comprises a tag storage portion, and
in the asynchronous state, said state determining portion causes said tag storage portion to store said processing number as a tag when said extraction signal set as said candidate is outputted, and after that, compares said processing number with said tag stored in said tag storage portion to determine whether said extraction signal corresponds to said candidate.

4. The synchronizing device according to claim 3, wherein said tag storage portion has a storage space capable of storing A ($1 \leq A \leq P$) values of said processing numbers and stores the values of said processing numbers into said storage space to store said tags.

5. The synchronizing device according to claim 3, wherein said tag storage portion has a storage space capable of storing one bit in each of P addresses, and stores a 1-bit signal into one of the addresses which corresponds to said processing number to store said tag.

6. The synchronizing device according to claim 1, wherein
said state determining portion further comprises a lock level generating portion for calculating a lock level having a plurality of steps of values from a lower limit to an upper limit,
wherein, every time the comparison in said second comparator portion repeatedly provides agreement between said extraction signal corresponding to said candidate or said definite head word and said synchronizing code, said lock level generating portion increases said lock level, one step at a time, in the range not exceeding said upper limit, and every time disagreement is repeatedly obtained, said lock level generating portion decreases said lock level, one step at a time, in the range not falling under said lower limit, and
said state determining portion determines whether it is in said asynchronous state or said synchronous state respectively depending on whether said lock level is lower than a certain step or not.

7. The synchronizing device according to claim 1, wherein said mode shifting portion makes control so that said pattern selecting portion intactly holds and outputs the preceding extraction signal in a resting period in which said pattern data extracting portion cannot extract any of the first to Kth extraction data from said data held in said shift register, and in the other period, so that said pattern selecting portion performs said selecting operation to output said extraction signal in synchronization with input of said second unit data into said shift register.

8. The synchronizing device according to claim 1, further comprising a clock generating portion for generating and outputting a pulse as a clock signal,
wherein said clock generating portion suspends output of said pulse in a resting period in which said pattern data extracting portion cannot extract any of the first to Kth extraction data from said data held in said shift register, and outputs said pulse in synchronization with output of said extraction signal in the other period.

9. The synchronizing device according to claim 1, wherein said state transition control portion outputs a certain signal in a resting period in which said pattern data extracting portion cannot extract any of the first to Kth extraction data from said data held in said shift register.

10. The synchronizing device according to claim 1, further comprising a data output portion which, in said synchronous state, outputs said synchronizing code independently of the value of said extraction signal when said extraction signal corresponds to said definite head word, and outputs said extraction signal as it is when said extraction signal does not correspond to said definite head word.

11. The synchronizing device according to claim 1, further comprising a head signal generating portion which outputs a certain signal when said extraction signal outputted from said pattern selecting portion corresponds to said candidate or said definite head word.

12. The synchronizing device according to claim 1, further comprising a tail signal generating portion which outputs a certain signal when said extraction signal outputted from said pattern selecting portion corresponds to the extraction signal just preceding said candidate or said definite head word.

* * * * *